(12) United States Patent
Gennetten et al.

(10) Patent No.: US 12,066,884 B2
(45) Date of Patent: Aug. 20, 2024

(54) COMPUTER-BASED SYSTEMS INVOLVING PIPELINE AND/OR MACHINE LEARNING ASPECTS CONFIGURED TO GENERATE PREDICTIONS FOR BATCH AUTOMATION/PROCESSES AND METHODS OF USE THEREOF

(71) Applicant: Capital One Services, LLC, McLean, VA (US)

(72) Inventors: Donald Gennetten, McLean, VA (US); Fatma Ben Yemna, McLean, VA (US); Gaurav Jain, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 172 days.

(21) Appl. No.: 17/528,122

(22) Filed: Nov. 16, 2021

(65) Prior Publication Data

US 2023/0153191 A1  May 18, 2023

(51) Int. Cl.
*G06F 11/07* (2006.01)
*G06F 16/23* (2019.01)
*G06F 18/214* (2023.01)
*G06N 20/00* (2019.01)

(52) U.S. Cl.
CPC ...... *G06F 11/0772* (2013.01); *G06F 16/2386* (2019.01); *G06F 18/2148* (2023.01); *G06N 20/00* (2019.01)

(58) Field of Classification Search
CPC ............ G06F 11/0772; G06F 16/2386; G06F 18/2148; G06N 20/00; G06N 5/01; G06N 7/01; G06N 20/20
USPC .......................................................... 714/57
See application file for complete search history.

(56) References Cited

U.S. PATENT DOCUMENTS

| | | |
|---|---|---|
| 6,968,248 B1 | 11/2005 | Mata |
| 10,671,443 B1 | 6/2020 | Ramachandran |
| 2022/0076164 A1* | 3/2022 | Conort ................. G06N 20/00 |
| 2023/0063248 A1* | 3/2023 | Cheng ................. H04L 9/3278 |

* cited by examiner

*Primary Examiner* — Yair Leibovich
(74) *Attorney, Agent, or Firm* — Greenberg Traurig, LLP

(57) ABSTRACT

Systems and methods involving provision of machine-learning-based prediction of future failure, anomaly, etc. in execution of batch processes are disclosed. In one illustrative implementation, an exemplary method may comprise obtaining historical data from prior execution of one or more batch processes, training a machine learning model to predict one or more future failure(s) and/or future flag(s) in execution of a future batch process, generating and/or collecting descriptive analytics pertinent to execution of the batch processes, and predicting a future failure and/or future flag in execution of the batch processes using the trained machine learning model and/or the descriptive analytics.

20 Claims, 11 Drawing Sheets

COMPUTER-BASED SYSTEMS INVOLVING PIPELINE AND/OR MACHINE LEARNING ASPECTS CONFIGURED TO GENERATE PREDICTIONS FOR BATCH AUTOMATION/PROCESSES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving automated predictions for batch automation/processes.

BACKGROUND OF TECHNOLOGY

A computer network platform/system may include a group of computers (e.g., clients, servers, computing clusters, cloud resources, etc.) and other computing hardware devices that are linked and communicate via computing components and/or systems, software architecture, communication applications, and/or software applications involved with data processing associated with determining or generating predictions regarding future failures.

SUMMARY OF DESCRIBED SUBJECT MATTER

In some embodiments, the present disclosure provides various exemplary technically improved computer-implemented methods involving batch processing, including prediction orchestration for batch process automation, one exemplary method comprising steps such as:
obtaining, by at least one computing device, a plurality of historical data from prior execution of the batch processes, the historical data comprising batch object data, incident data, and change order data;
training, by the at least one computing device, a machine learning model to predict one or both of at least one future failure or success and/or at least one future flag, such as late/timing issues (e.g. start times), mismatches, etc., in execution of a batch of processes, the training comprising:
extracting, by the at least one computing device, sets of features from the historical data, each feature of the sets of features relating to a failure in a historical execution, each set comprising a plurality of: a set of execution features, a set of object features, a set of workflow features, or a set of incident features;
pre-processing, by the at least one computing device, the sets of features to generate a training dataset; and
training, by the at least one computing device, the machine learning model with the training dataset;
generating and/or collecting, by the at least one computing device, descriptive analytics regarding one or more of: a mapping dependency, a history of information of files, or real-time information of the files; and
predicting, by at least one computing device, a future failure in execution of the batch processes using the trained machine learning model and the descriptive analytics.

It is to be understood that both the foregoing general description and the following detailed description are exemplary and explanatory only and are not restrictive of the disclosed technology. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
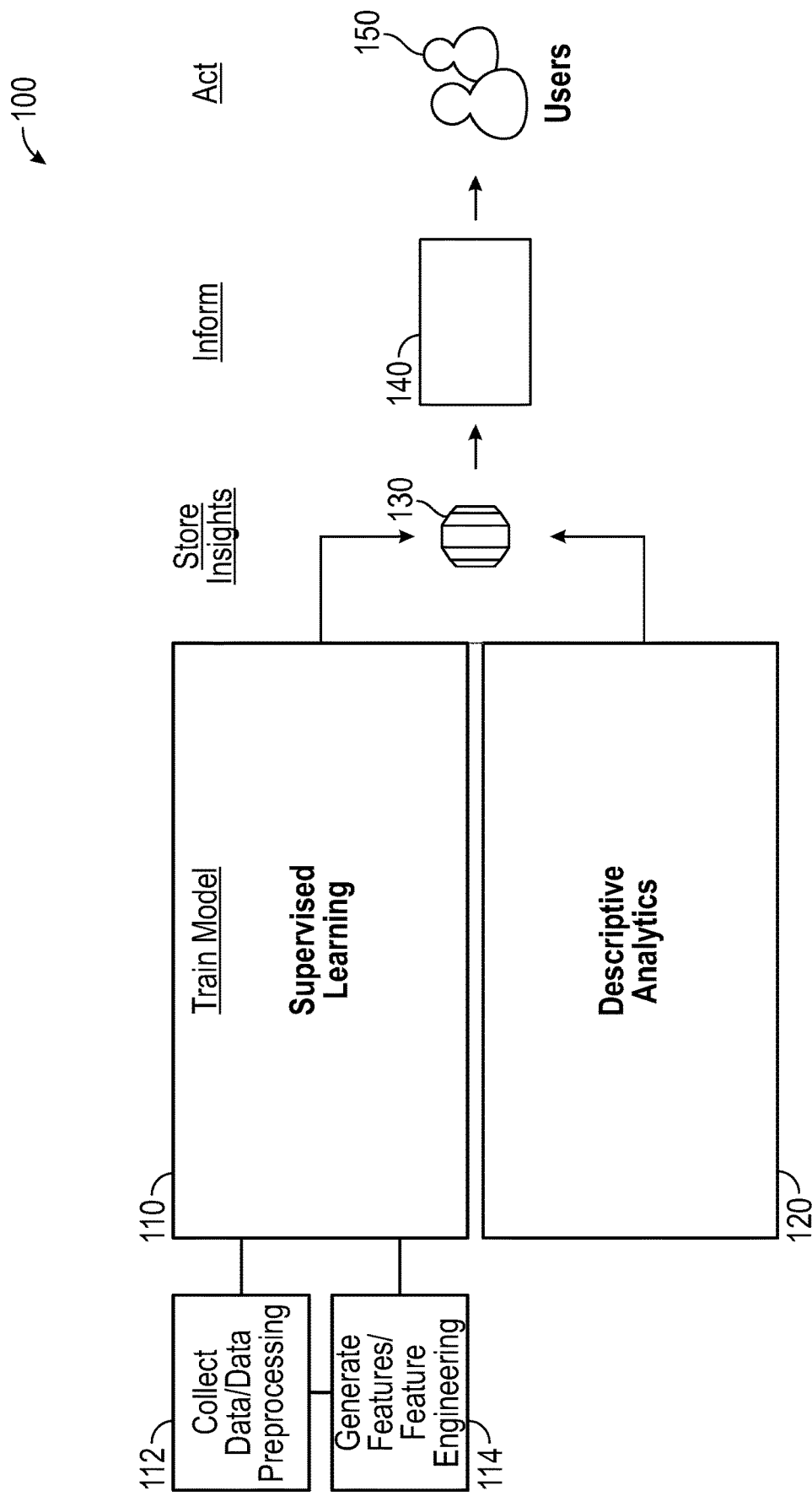
FIG. 1 is a block diagram illustrating an exemplary data collection and prediction system involving features of pipeline operation and/or machine-learning-based predictions for batch automation/processes, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for prediction of future outcomes, e.g., future failures, future successes, etc., in execution of batch processes. In one embodiment, an exemplary computer-implemented method of the present disclosure may include obtaining historical data from prior execution of batch processes, processing the historical data into training dataset to train a machine learning model to predict such future outcomes (e.g., failures, successes, etc.) in execution of batch processes along with collected descriptive analytics of the batch processes and/or dependencies, where such dependencies may be outside the batch process and may, in some embodiments be direct dependencies and/or more indirect dependencies, i.e., determined to be relevant, though just some delta (e.g., one or more 'hops') away from a direct dependency. While the illustrations described above and below typically refer to examples of detection, processing and/or handing of failures, it is noted that embodiments and models herein may predict and otherwise process both successes and failures. For example, according to implementations herein, for every batch job, systems and methods herein may be configured to predict whether such job will succeed or fail.

As used herein, in some embodiments, terms "batch process," "batch job," "batch automation," and "batch object" refer to any computation processes, applications and/or jobs that can execute without user interaction, or minimal user interaction, or be scheduled to run as resources permit. For instance, a batch process may comprise a number of workflows, a number of jobs, and the like, for execution at various times according to its configurations. A batch process may also be configured to intake a number of input files during various stages/phases of its execution; and similarly produce a number of output files during various stages/phases of its execution. As such, at various points in execution, a batch process may depend on the execution and/or completion of other jobs and/or workflows to run successfully to proceed to the next stage or completion.

As used herein, in some embodiments, the term "failure in execution" refers to any faults, anomalies, exceptions, failures, trends (pertinent to a potential failure and/or any other potential execution characteristics in execution), and the like, that occur during the duration of the start of a batch process and the completion of the batch process. For instance, a batch process may fail upon a late arrival of an input file required for continuous execution, or upon a corrupted input file required for continuous execution. In some embodiments, a failure in execution of a batch process may halt the processing of the entire batch job; while in some embodiments, a failure in execution may render a processing of the batch job into a soft-failing state such as a fail-safe and/or self-recovery state. In some embodiments, execution characteristics other than a potential failure to handle and/or act upon may include other stoppages such as job owners manually halting jobs, batch process and/or job timeout(s) because required dependencies are not met, and/or determination of other execution parameters that may affect provision of results, other desired outcomes, timing, completion, and the like.

Various embodiments disclosed herein may be implemented in connection with one or more entities that provide, maintain, manage, or otherwise execute any system involving one or more batch processes. In some embodiments, an exemplary entity may be a financial service entity that provides, maintains, manages, or otherwise offers financial services by use of one or more batch processes to automate various services or portions thereof. Such financial service entity may be a bank, credit card issuer, or any other type of financial service entity that generates, provides, manages, and/or maintains financial service accounts that entail automating the processing of data in a batch manner to, for example, process payments, process transaction, manage customer data, generate reports for one or more internal parties, customers, third-party service providers, and so on. Financial service accounts may include, for example, credit card accounts, bank accounts such as checking and/or savings accounts, reward or loyalty program accounts, debit account, and/or any other type of financial service account known to those skilled in the art.

FIG. 1 is a block diagram illustrating an exemplary data collection and prediction system involving features of pipeline operation and/or machine-learning-based predictions for batch automation/processes, consistent with exemplary aspects of certain embodiments of the present disclosure. Referring to FIG. 1, an exemplary data collection and prediction system 100 may comprise a pipeline, which may include various components such as a supervised learning stage 110 and a descriptive analytics stage 120, which, along with other components, may implement various features and functionality involving data collection, machine learning, and/or future failure predictions associated with execution of batch automation and/or batch processes. As shown in the illustrative embodiment of FIG. 1, which may, e.g., be implemented for highly complex critical scheduled and event based process automation systems, an exemplary data collection and prediction system 100 may include a supervised learning stage 110, a descriptive analytics stage 120, a stage for storing and/or handling insights 130, and one or more additional stages 140, 150 related to processing and/or generating predictions to inform operation or control of batch automation/batch processes. According to implementations herein, such additional stages may include, in some embodiments, a stage for storing and/or handling such predictions, at 140, as well as a stage of generating outputs or actions for taking action(s) and/or otherwise implementing the predictions, and thereby proactively avoid occurrence of associate adverse incidents, at 150. Further, in some embodiments, various aspects of data collection/data preprocessing 112 and/or feature generation/feature engineering 114 may be implemented prior to the supervised learning stage 110 wherein model selection, model training, and the like occur.

The exemplary supervised learning stage 110 of FIG. 1 may include various phases or features, such as data collection, feature generation, and model training, as set forth in more detail in connection with FIG. 3 and elsewhere, below. The exemplary descriptive analytics stage 120 of FIG. 1 may include various phases or features, as set forth in more detail in connection with FIG. 4 and elsewhere, below. Moreover, as set forth further below, information and outputs may be delivered, e.g., at output of 140, in ways that clearly indicate leading indicators of failure, anomalies, and trends, such as by indicating that one or more outputs are equal to or exceed a predetermined threshold, a probability of causing failure or delay, or the like, e.g., where such determination(s) are based on complex dependencies that are otherwise difficult or impossible to uncover. For example, in some embodiments, the alerting threshold of a job failure may be dependent on: (1) a determination based on metrics, such as failure to meet a desire signal orchestration, a file size parameter, a quality monitoring characteristic, analysis of metadata (e.g., header, size, etc.), and the like; (2) assessment of different indicators utilized to predict job outcomes; (3) assessment of predictions from historical job data, file arrival time, file size, etc.; and/or (4) the presence of a late file arrival and a delta between job and file of a specified timeframe, such as between 40 and 100 minutes in some embodiments, or between 50 and 90 minutes in some embodiments, or between 60 and 80 in some embodiments or about 70 minutes in some embodiments. In other embodiments, a job failure probability may be deemed high in a variety of exemplary situations, such as: (1) if the supervised learning model predicts high probability of failure and descriptive analytics predicts low probability of failure; (2) if supervised learning model predicts low probability of failure and descriptive analytics predicts high probability of failure; and/or (3) if supervised learning model predicts high probability of failure and descriptive analytics predicts high probability of failure.

Figure 2:
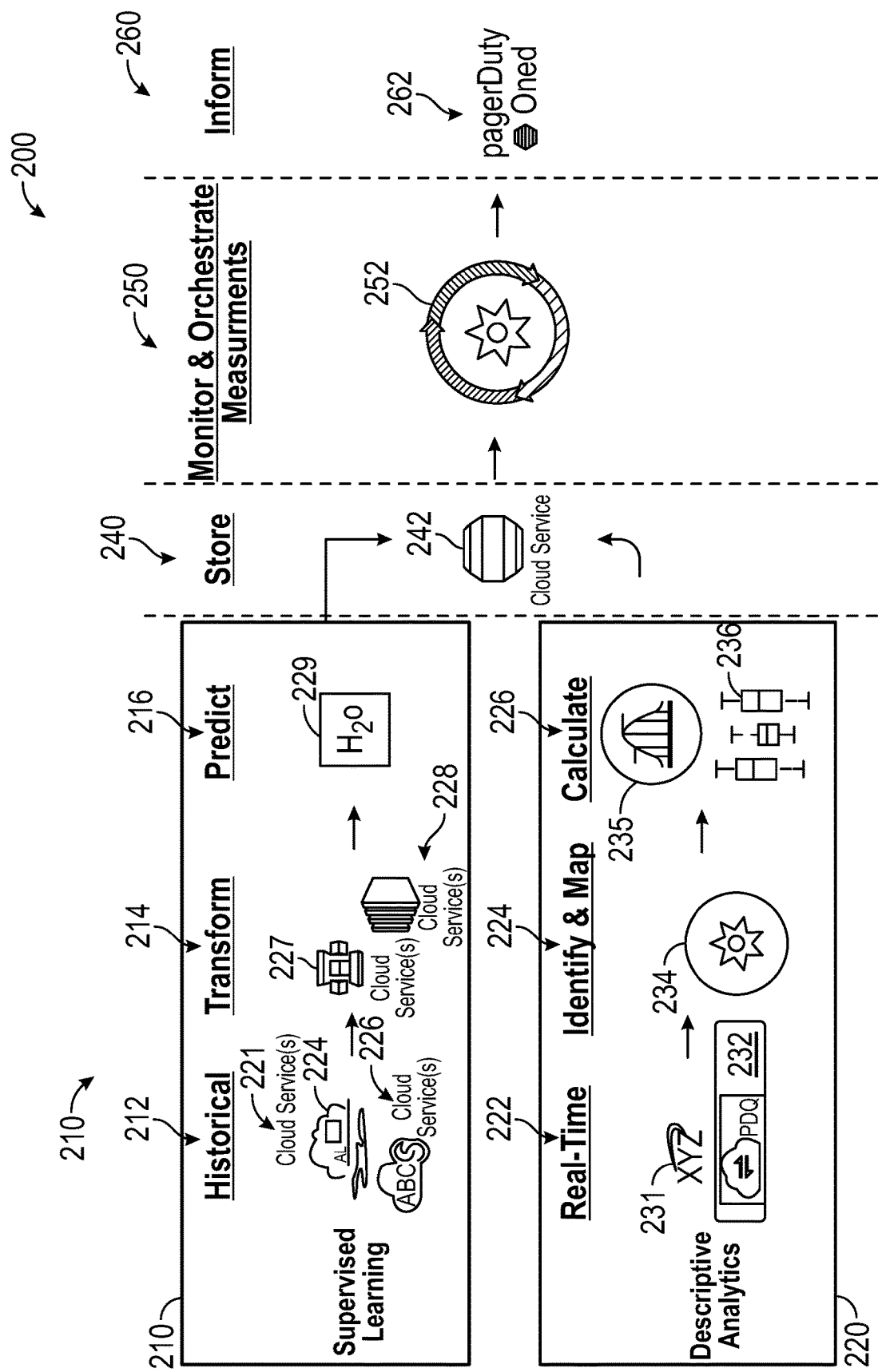
FIG. 2 is another, detailed block diagram illustrating an exemplary data collection and prediction system involving features of pipeline operation and/or machine-learning-based predictions for batch automation/processes, consistent with exemplary aspects of certain embodiments of the present disclosure.

FIG. 2 is a block diagram illustrating an exemplary data collection and prediction system 200 involving features of pipeline operation and/or machine-learning-based predictions for batch automation/processes, consistent with exemplary aspects of certain embodiments of the present disclosure. Referring to FIG. 2, the data collection and prediction system 200 may comprise a pipeline including various stages involving features and functionality associated with data collection, machine learning, training of machine learning models, and future failure predictions e.g., for batch process automation. As shown in this illustrated embodiment, the pipeline 200 may include a supervised learning stage 210, a descriptive analytics stage 220, a storing stage 240, a monitoring and/or orchestration stage 250, and an informing stage 260.

In embodiments, such as the example of FIG. 2, the supervised learning stage 210 may be configured to utilize various machine learning techniques and/or algorithms to generate and train one or more future failure prediction models with historical data associated with execution of batch processes to predict future failures. Here, such supervised learning stage 210 may be configured to implement a supervised learning pipeline and/or processes to train a prediction model to forecast future failures, as shown and described herein. According to the exemplary supervised learning pipeline and/or processes shown in FIG. 2, the machine learning stage 210 may include one or more components that collect and/or assemble historical data 212, one or more components that transform such data 214, and one or more components that generate predictions 216. In some implementations, historical data pertinent to execution of batch processes can be collected using various techniques and/or platforms. As shown in FIG. 2, for example, historical data 212 may include: historical incident and/or problem data (e.g., stored via one or more cloud services/locations 221, etc.) such as information about historical failures, impact and root causes; other historical data, e.g. stored in one or more data stores/data storage services 224 that host data from various sources, such as historical problem, historical change records, historical alerts, historical job execution data; and historical batch process data such as job execution data (e.g., stored via one or more cloud services 226, etc.) such as information about historical job runs, environment, schedules, and the like.

Further, in some embodiments, historical data critical to the execution of batch processes in the past may be identified and collected. For example, such historical data may include one or more of batch objects data, incidents data, change order data, and so on, various examples of which are set forth in Appendix A. According to implementations herein, critical data may be identified via feedback, e.g. from the underlying event based process automation system(s), such as log data, datapoints, build data, workflow data, survey results, information or insights obtained from entities such as developers, users and/or customers associated with the batch processes, problems and issues encountered in the past, changes made to batch process or system in the past, and the like. In some examples, based on various data or inputs associated with successful, complete, and/or timely availability of files, identifiable intra-dependency and/or inter-dependence information associated or involved with workflows, dynamic thresholds configured to trigger alerts, etc., various relevant data can be identified as critical data to train a future failure prediction model to forecast on the corresponding aspects with regard to the execution of the batch process. Further details are described in connection with the informing stage 260, set forth below.

In this illustrated embodiment, after the historical data is collected, at 212, the supervised learning stage 210 may transition from historical data collection to a transform data stage, at 214. According to various aspects of the disclosure, the transform stage 214 may be configured such that the historical data collected is processed and/or transformed into features that are used to generate and/or train one or more failure prediction models. In some embodiments, such transformation may process the collected data into features that correlate to various failure/success outcomes in execution of batch processes. The historical and transformed data may be stored locally and/or via various cloud storage platforms 227, such as Amazon Simple Cloud Storage (S3), Google Cloud Platform (GCP), and the like. Further, the historical data and other information may be processed via various cloud infrastructure 228, such as Amazon Elastic Computing (EC3), and the like. Here, for example, such cloud infrastructure may include systems, tool and software that perform data processing, create/process job to file mapping, and perform feature engineering, such as determining and handling the features utilized to build models or generate predictions.

According to some aspects of the disclosure, execution related data may be transformed into features including one or more feature such as: estimated runtime, latest runtime, total number of executions, failure percentage in historical executions, failure percentage in the last three executions, start times of the objects, and/or other features and/or related Aspects set forth in Appendix A.

According to some aspects of the disclosure, object related data may be transformed into features including one or more of: the number of days since the last modification, the total modification count, and/or the difference in failure percentage between the last two modifications.

According to some aspects of the disclosure, workflow related data may be transformed into features including one or more of: count of objects in a workflow, count of every object type in a workflow, type in a workflow failure percentage of all direct upstream objects in the workflow, failure percentage of all direct downstream objects in the workflow, and/or count of total different hosts in a workflow. Various addition examples of such features are set forth in the list attached hereto as Appendix A.

According to some aspects of the disclosure, incident related data may be transformed into features including one or more of: count of critical severity incidents related to an object; count of total high severity incident related to an object, count of total low severity incident related to an object, and/or count of change orders committed for an object. According to certain embodiments, for example: critical severity incidents may be defined as those where a critical business function is unavailable or considerably degraded in performance; high severity incidents may be defined as incidents having potential to impact customers or business units; and/or low severity incidents may be defined as those having only impact to internal teams and operations. In other aspects, high and how severity incidents may be defined external to the model. In the context of a financial institution, for example, incidents that have broad negative impact to the organization may be qualified as high severity (1, 2, 3c), whereas, while low or lower severity incidents (3, 4, 5) may have an impact, such impact may be defined as being contained within the organization and/or not customer facing. In still other embodiments, risk of failure, such as high risk of failure, may be determined via straightforward statistical techniques, for example mean or median, which, in some example embodiments, may be utilized to forecast file arrival times. Advanced techniques like AR, ARMA and ARIMA can also be used to forecast file arrival times. According to additional aspects, straightforward statistical techniques like Top-5 percentile or Bottom-5 percentile can be used to detect anomalous file size. Further, in some embodiments, unsupervised techniques like Isolation Forest and Local Outlier Factor may also be utilized to detect anomalous file size.

In some embodiments, before the features are applied to train the prediction model, the features may be further processed to generate clean features. For example, the features transformed from the historical data may be pre-processed, filtered, joined, and/or quality controlled to generate clean datasets of features. In one example, data related to manual restart of batch objects may be removed from the datasets during the process of generating the clean datasets.

In this illustrated embodiment, the features generated from the transformation stage may be provided to train a machine learning model to predict future failures in the batch processes. Various techniques and algorithms may be used to establish the prediction model. Further, a technology stack 229 (e.g., $H_2O$.ai, etc.) may be utilized to build Machine Learning models, here. In some embodiments, clean datasets of features may be processed such that the batch objects that incur both successful and failed executions of batch processes are selected. In certain implementations, such selection may be performed to associate the candidate batch objects with the execution in a pre-configured period of time. For example, such objects may have incurred both successful and failed execution in the past month, the past quarter, and the like. Accordingly, the cleaned datasets of features associated with such objects may be divided into two categories: one category of features associated with the successful executions are used to train the model to predict no failures; while the other category of features associated with the failed executions are used to train the model to predict failures. The trained prediction model and/or the predicted results using the model may be stored at the storing stage 240. In some implementations, the prediction model and/or the prediction may be stored, for example, in one or more cloud or other storage platforms and/or databases 242 (e.g., Amazon Aurora, etc.).

In some embodiments, the training that occurs at the prediction phase 216 may include iterative testing and/or a validating/validation process, e.g., until a desired degree of accuracy in prediction is achieved by the prediction model. For example, with an evaluation of the initially trained prediction model, the predicted results may be validated against the actual results to measure an accuracy degree in the prediction of failures. In some embodiments, the prediction model may be re-trained and re-validated with feedback data associated with the results predicted using non-training features.

Turning to additional analytics used in the pipeline, according to some aspects of the disclosed invention, the exemplary system 200 of FIG. 2 may implement the descriptive analytics stage 220 to collect, assemble, derive, or otherwise access historical information and/or analytics information regarding file transfer(s) associated with the underlying batch automation/batch processes. The descriptive analytics stage 220 may comprise a collection phase 222, an identify and map phase 224, and a calculate phase 226. Herein, various metrics such as historical information regarding file transfer may be collected and processed using suitable platforms, components and/or techniques. The example embodiment of FIG. 2 illustrates a first file movement platform 231 and a second file movement platform (e.g., PDQ platform 232, which may be an internal Capital One® platform, etc.) from which historical information regarding file transfer may be obtained in real-time, or near real-time, and stored as files for subsequent processing. Next, the identify and map phase 224 may include one or more platforms and/or components to perform data transformation and processing, at 234. Via such data transformation and processing 234, for example, the files generated in the initial phase may be mapped to their respective jobs. Next, at the calculate phase 226, various tools and techniques 235, 236 may be implemented on the mapped data and jobs to perform various analysis to predict future file information, such as future file arrival times, file sizes, file status, and the like. Such analysis may comprise statistical analysis, machine learning models, other AI predictive assessment, or the like. Lastly, according to embodiments here, results and data may be output from the descriptive analytics stage 220 for transmission to and storage at the one or more cloud or other storage platforms and/or databases 242, which may also store the insights (e.g., outputs, results, etc.) from the supervised learning stage 210.

With the insights from both the supervised learning stage 210 and the descriptive analytics stage 220, the system 200 of FIG. 2 may continue to the next stage in the pipeline, the monitoring and orchestration stage 250. Here, at the monitoring and orchestration stage 250, the system may utilize one or more systems, engines and/or tools, at 252, to correlate and combine the insights determined from the supervised learning stage 210 and the descriptive analytics stage 220. Such engines/tools, at 252, may perform various correlations and/or combinations to forecast information regarding, e.g. future failures, dependencies, temporal features, changes, failure trends, real-time status, and so on. In some implementations, historical data relating to start times for a batch process object may be applied to the prediction model so as to forecast a start time for the batch object in the future. In some embodiments, such engines/tools 252 may also process predictions regarding which batch objects are to be started in the future. In certain implementations, calculations such as median information related to file transfer data may be utilized via the prediction model to determine expected file arrival time and/or file size. Further, with the real-time/near real-time information gathered, e.g., regarding file statuses, file sizes, etc., the system 200 may detect late arriving files, based on which execution of a batch object may be identified as at risk of future failure. In some embodiments, such "predictions" for jobs and files may be mapped to each other based on historical temporal patterns. Further, as a result of such processing, jobs that are critical, high, and/or low risk of failure may be identified. Here, for example, meeting such criteria may be determined as set forth, above, such that these situations are identified and/or associated failures (or successes) are predicted. Finally, with the future failure of such jobs predicted, the system 200 may transition to the informing stage 260.

At the informing stage 260, various components 262 such as platforms and/or applications may be utilized to generate alerts to inform system operators and/or users/customers regarding the jobs predicted to be at high risk for failure as well as association information which may enable resolution of the predicted failure. Here, in this illustrated example, components 262 may include one or more software applications 262 (e.g., such as an alerting and/or visualization layer, application or tool, etc.) may be implemented to communicate the predicted future failure. In some embodiments, such alerts may be generated based on thresholds that are adjusted intelligently and/or dynamically to reduce the rate of false positives.

Figure 3:
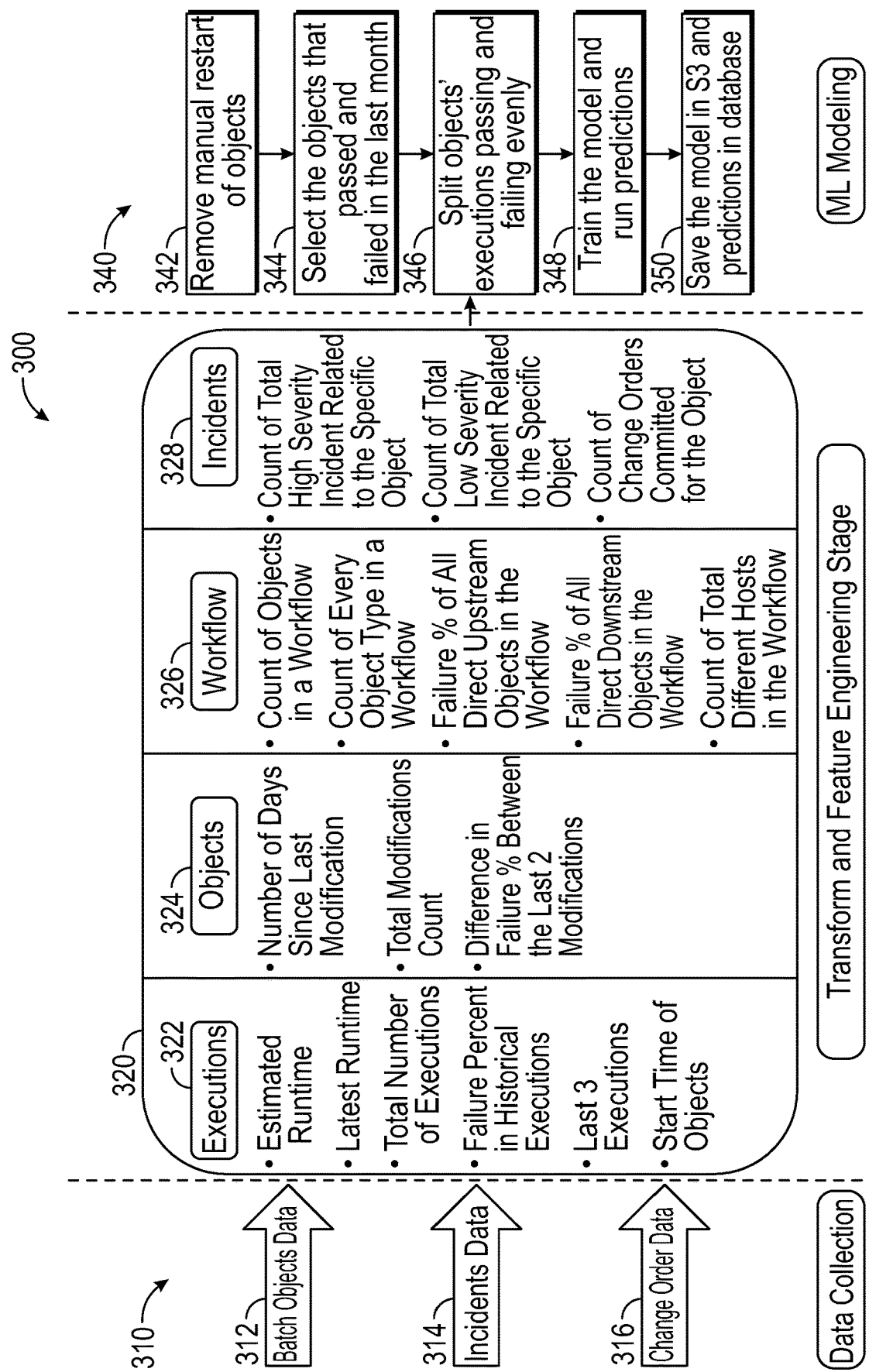
FIG. 3 is a block diagram illustrating an exemplary supervised learning pipeline associated with one representative data collection and prediction system, consistent with exemplary aspects of certain embodiments of the present disclosure.

FIG. 3 is a block diagram illustrating an exemplary supervised learning pipeline 300 associated with one representative data collection and prediction system, consistent with exemplary aspects of certain embodiments of the present disclosure. Referring to FIG. 2, the exemplary supervised learning pipeline 300 may comprise a data collection stage 310, a transform stage 320, and a machine learning modeling stage 340. According to embodiments herein, the data collection stage 310, which corresponds loosely to assembling historical data at 212 above, may include collecting historical data inputs including batch objects data 312, incident data 314, and change order data 316. With these and/or other input data collected, the supervised learning pipeline 300 proceeds to the transform stage 320.

At the transform stage 320, feature engineering is performed to transform the inputs to features that are correlated to object failures. Here, for example, the input variables collected may be processed and/or transformed based on a variety of different characteristics, including but not limited to executions 322, objects 324, workflow, and incidents 328. With regard to handling the input data based on execution information, at 322, the transform stage may process the input data based on estimated runtime, latest runtime, total number of executions, failure percent in historical executions, and start time of objects, among others. With regard to handling the input data based on object information, at 324, the transform stage may process the input data based on number of days since last modification, total modifications count, and difference in failure percentage between the last 2 modifications, among others. With regard to handling the input data based on workflow information, at 326, the transform stage may process the input data based on count of objects in a workflow, count of every object type in a workflow, failure percentage of all direct upstream objects in the workflow, failure percentage of all direct downstream objects in the workflow, and count of total different hosts in the workflow, among others. With regard to handling the input data based on incident information, at 328, the transform stage may process the input data based on count of total high severity incidents related to the specific object, count of total low severity incidents related to the specific object, and count of change orders committed for the object, among others.

In the final stage of the example supervised learning pipeline of FIG. 3, the feature data obtained via the transform stage 320 is provided to the machine learning (ML) modeling stage 340. Here, in the ML modeling stage 340, FIG. 3 depicts one illustrative sequence of ML processing, though other such sequences may also be utilized. In the example of FIG. 3, the illustrative ML modeling process may include removing manual restart of objects 342, selecting the objects that passed and failed in the last month 344, evenly splitting objects' executions passing(s) and failing(s) 346, training the model and running predictions 348, and saving the model and the predictions in one or more databases 350. Once generated, the trained prediction model and/or the predicted results using the model may be stored at the storing stage 240, as set forth in more detail in connection with FIG. 2, above.

Figure 4:
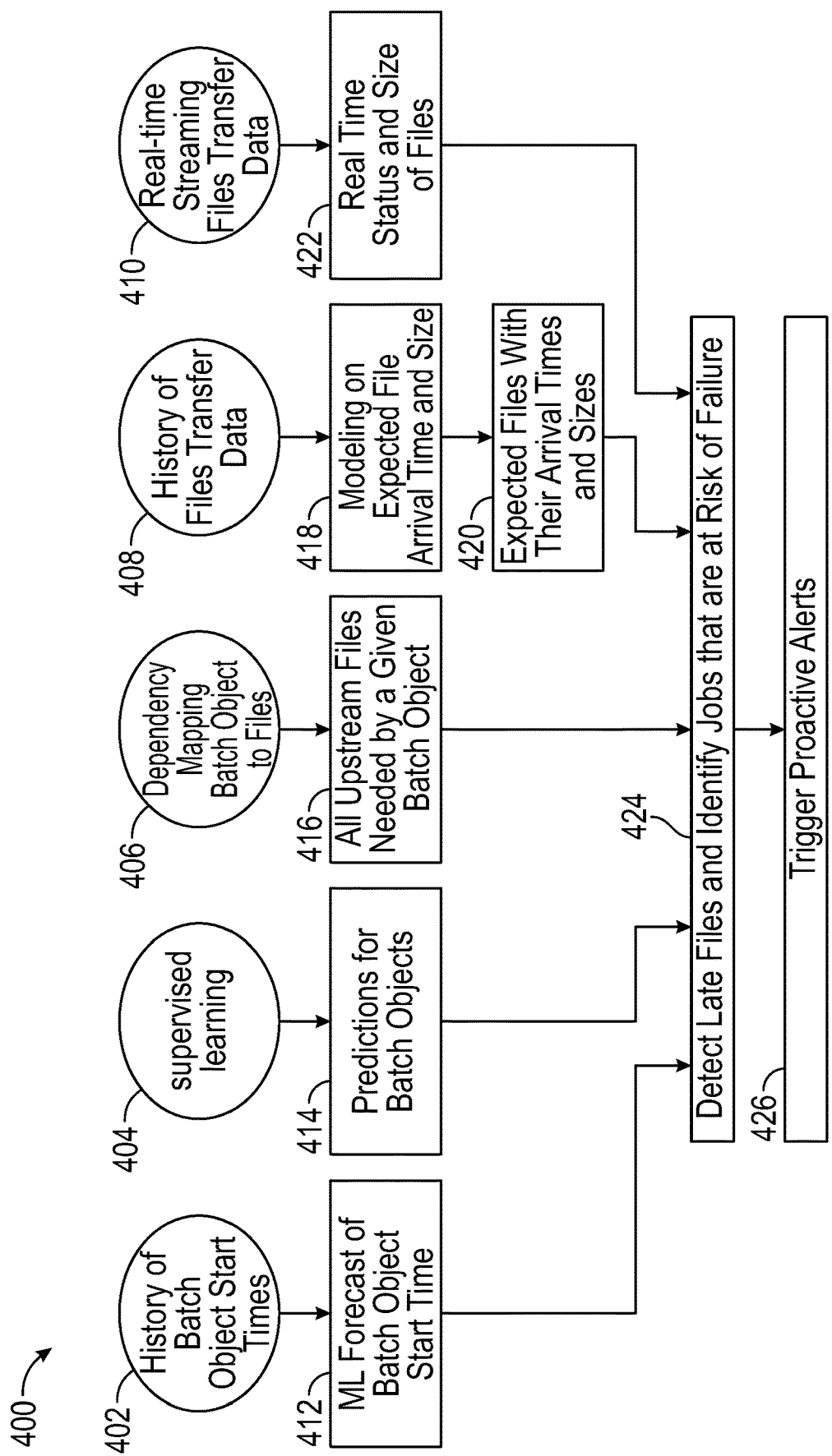
FIG. 4 is a block diagram illustrating an exemplary descriptive analytics pipeline associated with one representative data collection and prediction system, consistent with exemplary aspects of certain embodiments of the present disclosure.

FIG. 4 is a block diagram illustrating an exemplary descriptive analytics pipeline 400 associated with one or more representative data collection and prediction systems 100, 200, consistent with exemplary aspects of certain embodiments of the present disclosure. The exemplary descriptive analytics pipeline 400 of FIG. 4 illustrates exemplary processing and handling of files and file transfer information configured to generate and trigger proactive alerts of predicted failures, according to embodiments herein. In FIG. 4, the descriptive analytics pipeline 400 may process a variety of acquired file data, including history of batch object start times 402, supervised learning insights 404 determined from FIG. 3, dependency mapping information 406 such as mapping batch objects to files, history of file transfer data 408, and real-time streaming file transfer data 410. As explained, below, such information and insights (e.g., 402, 404, 406, 408, 410, etc.) is then further processed, with the results being provided to a stage that detects late files and identifies jobs that are at risk of failure, at 424. Finally, according to the illustrated embodiment, based on the detection and identification at 424, systems and methods herein may then trigger proactive alerts, at 426, i.e., as a function of such determinations.

Referring to FIG. 4, such processing of information and insights may include, at 402, processing historical information of batch object start times. Here, for example, machine learning or other algorithms may be utilized, at 412, to forecast or otherwise determine expected batch object start times. These forecasted start times may then be provided to the detection and identification stage 424, for utilization in determining jobs that are at risk of failure. In some embodiments, forecasted start times may be processed in conjunction with file arrivals to identify instances where a particular file necessary for a job's execution is late. In such cases, the late file arrival may be utilized as a leading indicator of job failure. In other embodiments, straightforward statistical techniques, for example mean, median, etc., may be utilized to forecast batch object start times. Also, advanced modeling techniques like AR, ARMA or ARIMA may be utilized to forecast batch object start times.

Further, in the illustrative embodiment of FIG. 4, this processing of the information and insights may also include, at 404, processing insights determined via the supervised learning stage (e.g., 210 of FIG. 2, 300 of FIG. 3, etc.). Here, for example, the various insights and information determined during the supervised learning stage(s) may be processed and/or provided to the detection and identification stage 424, for utilization in determining jobs that are at risk of failure. Here, for example, various supervised learning algorithms like Random Forest, Gradient Boosting, Neural Networks, Support Vector machines etc. may be utilized to build models that learn the relationships between job attributes and job failures, and the patterns in the failures. Such models may then be utilized to predict the outcome of jobs that have not run yet.

Additionally, in the illustrative embodiment of FIG. 4, this processing of the information and insights may also include, at 406, processing dependency information including mapping of batch objects to files. Here, for example, systems and methods herein may determine all upstream files needed by a given batch object and process such information, at 416, to generate associated dependency information for provision to the detection and identification stage 424, for utilization in determining jobs that are at risk of failure. According to implementations herein, a separate process may be utilized to identify the job-file dependency information, e.g., at 406 and 416, and wherein, with such information, embodiments of the machine learning model herein may then identify jobs at risk of failure, at 424. Further, in some aspects, upstream dependencies may be determined from the business logic or be discovered by analyzing code, reports and logs.

Furthermore, in the illustrative embodiment of FIG. 4, this processing of the information and insights may also include, at 408, processing historical information regarding past file transfer data. Here, for example, systems and methods herein may, at 418, perform processing and/or modeling (machine learning modeling, or otherwise) regarding expected file information, such as expected file arrival time, expected file size, etc. As a result of this processing and/or modeling, implementations herein may generate output information, at 420, e.g., the expected files, expected arrival times, expected file sizes, etc. Finally, this output information, from 420, is then provided to the detection and identification stage 424, for utilization in determining jobs that are at risk of failure. In some embodiments, historical file arrival data may be utilized to establish normal arrival patterns for files that are identified as integral for job execution. Here, for example, a file's late arrival may then be deemed indicative of potential job failure. Additionally, according to certain embodiments, straightforward statistical techniques, e.g., mean, median, etc., may be utilized to forecast file arrival times, here. Advanced techniques like AR, ARMA and ARIMA can also be used to forecast file arrival times. Further, as also set forth elsewhere herein, straightforward statistical techniques like Top-5 percentile or Bottom-5 percentile may be utilized to detect anomalous file size. In some aspects, unsupervised techniques like Isolation Forest and Local Outlier Factor may also be utilized to detect anomalous file size.

In a final example of information being processed, on the right side of FIG. 4, such information may also include, at 410, processing real-time information regarding streaming file transfer data. Here, for example, systems and methods herein may, at 422, perform processing of streaming file transfer data to determine real-time file information, such as file status, size of files, etc., which is factored into subsequent alert processing. This output information 420, is then provided to the detection and identification stage 424, for utilization in determining jobs that are at risk of failure.

Figure 5:
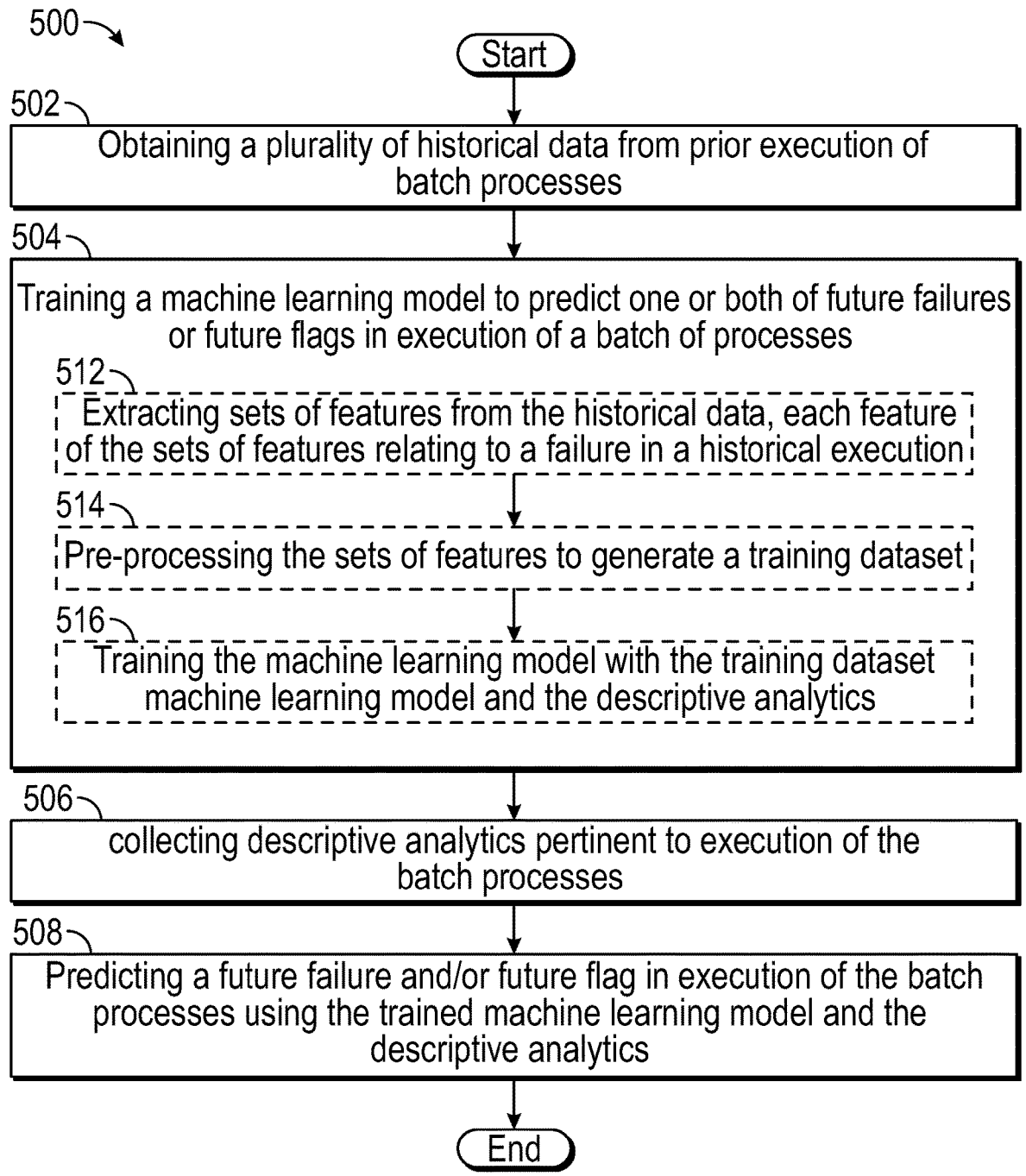
FIG. 5 is a flowchart illustrating an exemplary method for processing predictions for batch automation/processes, consistent with exemplary aspects of certain embodiments of the present disclosure.

FIG. 5 is a flowchart illustrating an exemplary method for processing predictions for batch automation/processes, consistent with exemplary aspects of certain embodiments of the present disclosure. Referring to FIG. 5, the illustrative predictive process 500 may comprise: obtaining a plurality of historical data from prior execution of batch processes, at 502; training a machine learning model to predict one or both of future failures or future flags in execution of a batch of processes, at 504; collecting descriptive analytics pertinent to execution of the batch processes, at 506; and predicting a future failure and/or future flag in execution of the batch processes using the supervised learning model/insights and the descriptive analytics, at 508. In other embodiments, the illustrative predictive process 500 may be carried out, in whole or in part, in conjunction with one or more servers and/or computing devices that are connected via one or more networks to a server, such as a server executing instructions performing one or more steps or aspects of various embodiments described herein.

In some embodiments, the predictive process 500 may include, at 502, a step of obtaining a plurality of historical data from prior execution of batch processes. With regard to the disclosed innovations, such historical data from the prior execution of the batch processes may include one or more of: batch object data, incident data, change order data, and the like. In some embodiments, the collection of such historical data may be performed by at least one computing device. Here, for example, the at least one computing device may comprise a financial service provider (FSP) system. This FSP system may comprise one or more servers and/or processors associated with a financial service entity that provides, maintains, manages, or otherwise offers financial services. Such a financial service entity may include a bank, credit card issuer, or any other type of financial service entity that generates, provides, manages, and/or maintains financial service accounts for one or more customers. In some embodiments, the at least one computing device may comprise a data processing system partially or wholly external to an FSP system.

According to various aspects of the disclosure, the illustrative predictive process 500 may further include a step of monitoring data/anomalies of batch processes to enable access to such historical data of the prior execution of the batch processes. In some embodiments, such monitoring may involve capturing and recording data such as batch object data, incident data, change order data, and the like. In some embodiments, the monitoring may involve capturing and recording data that may be used to derive or otherwise obtain batch object data, incident data, change order data, and the like.

According to certain embodiments, the illustrative predictive process 500 may include, at 504, a step of training a machine learning model to predict one or both of future failures or future flags in execution of a batch of processes. Various implementations herein may be configured such that the future failures and future flags being predicted may be based on and/or involve attributes pertinent to the execution of the batch processes, e.g., batch process starting time, mismatches, a failure status with regard to at least one of: a job run time, a job status, a job rank in a workflow, a proximity to a configuration change in terms of a time duration, a proximity to a configuration change in terms of dependencies, a status associated with a file being generated on time, a status associated with a file being available, a status associated with a file being complete, a status associated with a file being accurate; a workflow dependency, a support/ownership identity; a dynamic threshold with regard to data, a holiday schedule, and a banking processing schedule, among others.

In some embodiments, the step of training a machine learning model to predict one or both of future failures or future flags in execution of a batch of processes may further includes various sub-steps, including: a first sub-step 512 of extracting sets of features from the historical data, each feature of the sets of features relating to a failure in a historical execution; a second sub-step 514 of pre-processing the sets of features to generate a training dataset; and a third sub-step 516 of training the machine learning model with the training dataset machine learning model and/or the descriptive analytics.

With regard to the first sub-step 512 of extracting sets of features from the historical data, in some embodiments, each feature set may comprise one or more of: a set of execution features, a set of object features, a set of workflow features, or a set of incident features, and the like. Here, for example, the set of execution features may include one or more of: estimated runtime, latest runtime, total number of executions, failure percentage in historical executions, failure percentage in the last three executions, and/or start times of the objects. The set of object features may include one or more of: the number of days since the last modification, the total modification count, and/or the difference in failure percentage between the last two modifications. The set of workflow features may include one or more of: count of objects in a workflow, count of every object type in a workflow, type in a workflow failure percentage of all direct upstream objects in the workflow, failure percentage of all direct downstream objects in the workflow, and/or count of total different hosts in a workflow. The set of incident features may include one or more of: count of critical severity incidents related to an object, count of total high severity incidents related to an object, and/or count of total low severity incidents related to an object, and/or count of change orders committed for an object. Examples regarding determining and handling such differing types of incidents are set forth elsewhere herein.

With regard to the second sub-step 514, in some embodiments, the sets of features may be pre-processed to remove therefrom sets/features associated with batch objects that have been subjected to manual starts, and/or other manual intervention during their executions. In some embodiments, the sets of features may be pre-processed to select both the batch objects that have executed to successful completion and have failed in a pre-configured duration of time. For example, those passing and failing batch objects in the past week, month, quarter, and the like, may be selected from the historical data to generate the training dataset. In some embodiments, the training dataset may be divided into various sets such as: a first training set defined via a set of features associated with batch objects that passed or executed successfully, a second training set defined via a set of features associated with those batch objects that failed, etc. Here, for example, such first training set may be designated as the positive or successful training set and the second training set may be designated as the negative or failed training dataset, e.g., as utilized when predicting whether a batch object is likely to process successfully versus predicting whether a batch object is likely to fail.

With regard to the third sub-step 516, in some embodiments, the machine learning model may be trained in a supervised-learning manner. In some embodiments, here, for example, the above-described positive training dataset may be applied to a machine learning model to train it to accurately predict whether or not a batch process is expected to successfully execute to completion. According to other aspects, an exemplary negative training dataset, as noted above, may be applied to the machine learning model to train it for predicting that a batch process is likely to lead to a potential failure, and/or other anomalies, flags, or trends. In some embodiments, the training of the machine learning model may comprise evaluating a prediction result of the machine learning model and retraining the machine learning model. In various implementations, such machine-learning process may be supervised, unsupervised, or a combination thereof. In some embodiments, such machine-learning based prediction models may include and/or involve one or more of a statistical model, a mathematical model, a Bayesian dependency model, a naive Bayesian classifier, a Support Vector Machine (SVMs), a neural network, and/or a Hidden Markov Model.

In some embodiments, the illustrative predictive process 500 may include, at 506, a step of collecting descriptive analytics pertinent to execution of the batch processes. In various embodiments, the descriptive analytics may include one or more of: a mapping dependency, a history of information of files, or real-time information of the files, and the like. In various implementations, the mapping dependency may indicate one or more workflows, other batch processes, and the like, on which the batch process' execution depends to run successfully at various stages. In some examples, the mapped dependency may indicate intra-entity dependence; and in other examples, the mapped dependency may indicate inter-entity dependence. According to certain implementations, the history of information of files may include a predicted file arrival time, an expected file size, and/or other such predicted/expected file information. The real time information of files may include real time execution status and/or size, e.g., with regard to the generation and/or transmission of a file expected of the batch process. In some embodiments, all of the files upstream that are needed by the batch process during execution may be identified as the mapped dependency for the batch process.

In some embodiments, the illustrative predictive process 500 may include, at 508, a step of predicting a future failure and/or future flag in execution of the batch processes using the supervised learning model and/or descriptive analytics insights. In various embodiments, an analysis engine (e.g., the analysis engine 252 of FIG. 2) may be used to intake both the predictions with regard to the execution of the batch process from the trained machine learning model and real-time analytics to generate a prediction of a future failure, anomaly, and/or trends regarding the execution of the batch process. Here, for example, an analysis engine may process, from the machine learning model, predicted batch objects, predicted start time for the batch objects, predicted file arrival time based on the mapped dependency, and/or predicted file size based on the mapped dependency. Further, the analysis engine may take into account the real time data regarding the execution status and/or file size for the batch process. Based upon such factors (i.e., these two and/or others), the analysis engine may be configured to predict a future failure, anomaly, and/or trend with regard to the execution of the batch process. For example, as a function of information such as at what point of time the batch process has to have access to which files in order avoid failure, and/or information as to required files are not likely to be delivered on time and/or in a un-corrupted condition at that point time (e.g., given the knowledge of the real time analytics on the current file generation status/size), the analytic engine may predict that failure is likely to occur at some point of time in the future. In some embodiments, based on such predictions regarding future failures, incidents, anomalies, and/or trends, the batch process may be subject to proactive remedy measures to render the batch process more resilient to failures, and/or improve success rates (e.g., greater chance of successful completion, etc.) and/or efficiency (e.g., time to successful completion, etc.) in terms of both the batch processing and any recovery processes.

In some embodiments, the batch process execution predictive process 500 may further include a step of triggering an alert based on: (i) detection of late files, and/or (ii) identification of one or more jobs that are at risk of incurring failure, anomaly, and/or trend. In some implementations, for example, the alert may include a prediction with regard to a starting time when the incident is predicted to occur for a process of the batch of processes. For example, the prediction may inform a party (e.g., a downstream customer, etc.) that the batch process is expected to reach a failed state in a certain amount time. In other implementation, visualized dependency information and the rationale for the predicted failure may also be provided in the alert to the user.

In some embodiments, the batch process execution predictive process 500 may further include a step of determining and issuing one or more proactive actions based on a predicted future failure, anomaly, and/or trends.

Figure 6:
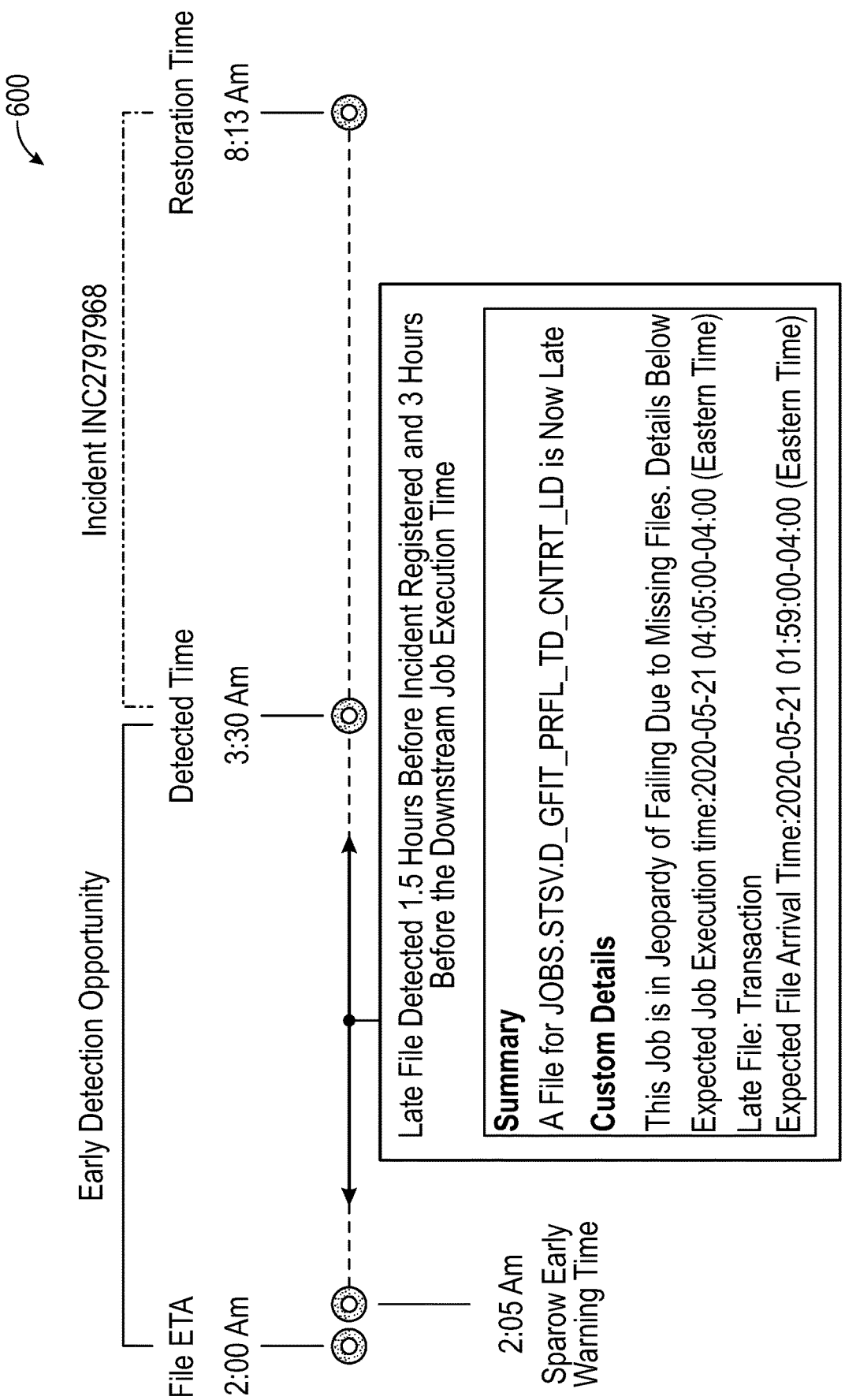
FIG. 6 is a diagram depicting an illustrative job failure early warning example, consistent with exemplary aspects of certain embodiments of the present disclosure.

FIG. 6 is a diagram depicting an illustrative job failure early warning example, consistent with exemplary aspects of certain embodiments of the present disclosure. Referring to FIG. 6, details of an early warning example 600 are shown, including a timeline that illustrates an estimated time of arrival of a file at 2:00 am, a conventional time of detection of an anomaly or incident at 3:30 am, as well as the early detection of the predicted incident at 2:05 am. Accordingly, as shown by way of illustration here in FIG. 6, the exemplary late file, which would normally have been detected at 3:30 am, is detected approximately 1.5 hours earlier, at 2:05 a, when the present innovations are able to detect a late arrival of the subject file, and perform processing according to the disclosed technology to promptly determine that subsequent execution of the job is in jeopardy based on this delay and the associated processing. Further, as shown in FIG. 6, implementations herein may also display a notification 620 which serves to communicate information regarding the detected incident and likely or expected ramifications. Here, for example, such notification 620 may include a summary of the anomaly or anomalies detected, a description of the file(s) that are late or problematic, and/or additional information regarding any predicted or expected impact(s) of these anomalies.

Figure 7:
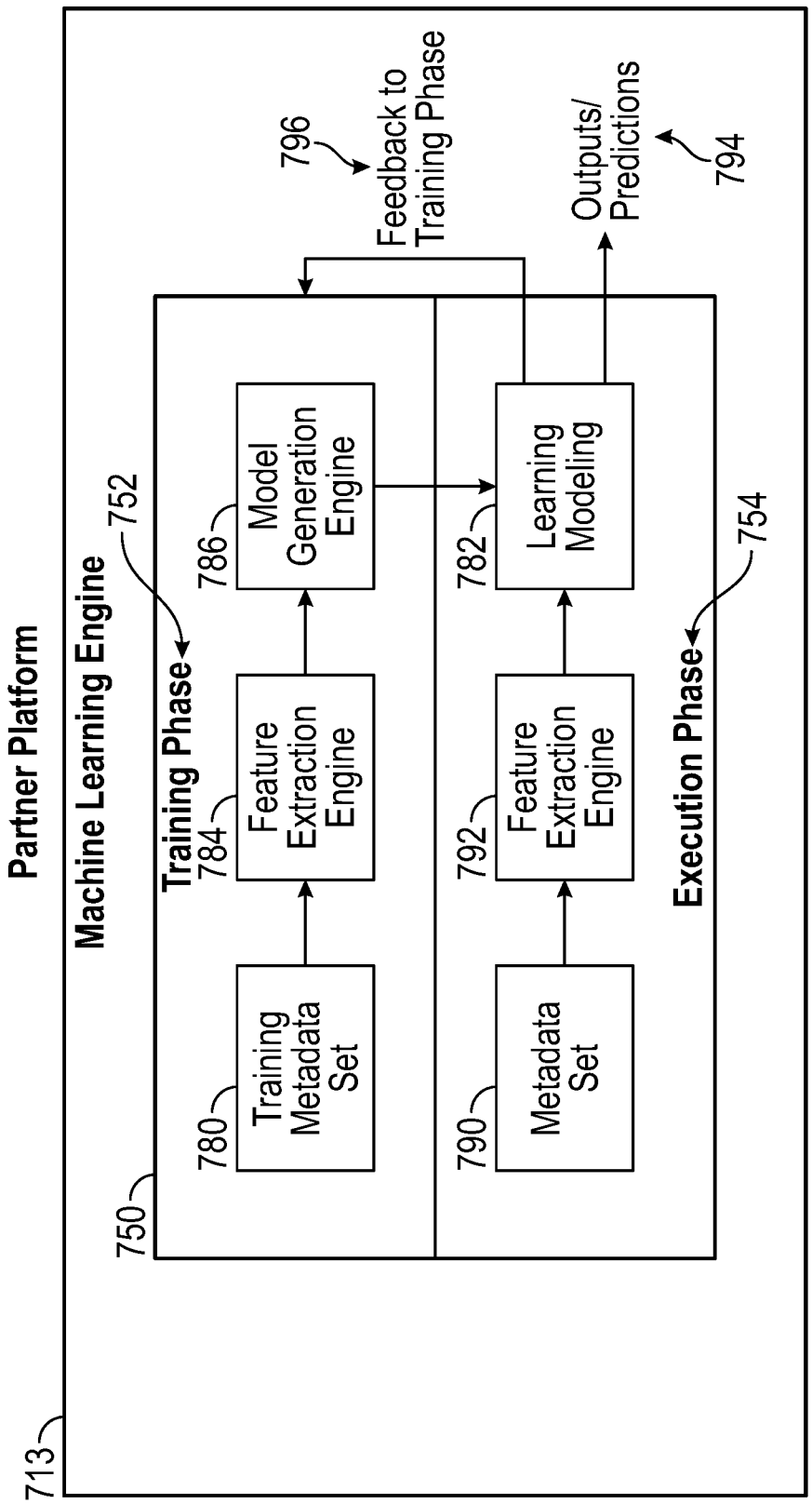
FIG. 7 is a block diagram of an exemplary machine learning engine that may be involved with predictions for batch automation/processes, consistent with exemplary aspects of certain embodiments of the present disclosure.

FIG. 7 is a block diagram illustrating an exemplary system involving a machine learning based anomaly model, which may be implemented in conjunction with the machine learning modeling herein (e.g., 340 of FIG. 3, etc.), consistent with various aspects of the disclosure. As shown in FIG. 7, a machine learning engine or system 750 includes a training phase 752 which trains a machine learning anomaly model and an execution phase 754 which uses the machine learning anomaly model to detect anomalies in batch automation enabling prediction of expected failures.

As shown herein, the training phase 752 builds a machine learning anomaly model 782 for a collection of batch automation data (e.g., historical, real-time, etc.) and extracted features. The training phase 752 may utilize a training metadata dataset 780, a feature extraction engine 784, and an anomaly model generation engine 786.

The training metadata dataset 780 is a corpus of metadata records obtained or otherwise identified or recognized with regard to a multitude of data, for example, those obtained from various data sources described above. The training dataset 780 may comprise training data related any of the various batch automation data described herein. The training dataset 780 may be generated as set forth herein, or obtained from a third party which warehouses and services batch automation data for various purposes such as machine learned model generation. In such cases, the training metadata dataset 780 may be stored as a cloud or web service that is accessible to various parties through online transactions over a network.

Referring to the exemplary embodiment of FIG. 7, the feature extraction engine 784 may be configured to extract features from the metadata training set to train the anomaly model 782. In some embodiments, the anomaly model 782 may be trained in a supervised manner, a semi supervised manner, and/or an unsupervised manner. Consistent with the disclosed technology, the feature extraction engine 784 may transform the features into feature vectors with, for example, an annotation and/or a software tag that indicates whether a feature vector corresponds to an anomaly or not. According to embodiments herein, the feature vector may represent one or more changes in expected file data, respective metadata, and the like. In some aspects, the feature vectors may then be utilized to train and test the anomaly model to detect the likelihood or probability that an anomaly has occurred, e.g., leading to predicted failure in an associated job. In some embodiments, the feature vectors may be partitioned into two subsets such that one subset is used to train the anomaly model and the second subset is used to test the anomaly model. In some implementations, the anomaly model is trained and tested repeatedly and/or cross-validated until the anomaly model can perform anomaly detection and associated predictions within known or established parameters, such as with a pre-configured confidence level, with a specified or desired error tolerance level, and the like.

In some embodiments, the anomaly model 782 may be a classification model. Here, for example, such classification model may be utilized to predict and avoid incidents in highly complex critical scheduled and event-based process automation systems. Various classification models, such as models characterized as, without limitation, discrete tree classifiers, random forest classifiers, neural networks, support vector machine, naive Bayes classifiers, and the like, may be generated as an anomaly model. In some embodiments, an extra trees classifier based classification model is generated. In some embodiments, the anomaly model 782 may comprise one or more cascade-based models for detecting anomalies via multiple stages. Each stage may be associated with a stage specific model and a stage specific detection threshold such as risk levels. Further, in various embodiments, various supervised learning algorithms like Random Forest, Gradient Boosting, Neural Networks, Support Vector machines, etc. may be utilized to build models that learn the relationships between job attributes and job failures, and the patterns in the failures. Here, for example such models may then be utilized to predict the outcome of jobs that have not run yet.

In the illustrative embodiment of FIG. 7, the execution phase 754 may apply the anomaly model 782 to a set of metadata 790 obtained from batch automation processes and file information. In some embodiments, the feature extraction engine 792 may generate feature vectors having features that represent different manifestations of anomalies in the set of data. The anomaly model 782 then uses the feature vectors to assign a risk level to the set of data. In some embodiments, the anomaly model 782 may draw a conclusion, based on the risk level exceeding a pre-configured threshold level or a machine learned threshold level, that there is occurrence of an anomaly in the set of metadata 790 to output a detection of an anomaly 794. In some embodiments, the anomaly model 782 may further associate a rationale for the anomaly detected conclusion. A rationale supporting the determination that there has been an anomaly detected may include a single feature in the feature vector that is dispositive of the detection (e.g., given a particular context or setting of the data analyzed), a combination of features, or an ordered or otherwise structured combination of features that contribute to the conclusion of a detected anomaly. In some embodiments, the rationale and a verification result of the detected anomaly is fed back 796 to the training phase 752 to retrain the anomaly model 782.

In various embodiments, the training metadata dataset 780 may include metadata items annotated with a baseline status to indicate an absence of an anomaly associated with historical information, known dependencies, etc. A baseline status indicates the opposite of a presence of an anomaly in the batch, file and/or job data. In some embodiments, a range of metadata items may be labeled as being associated with a baseline status when anomalies lie outside of a range of normal conditions and status. When the metadata items in the training dataset indicate an absence of an anomaly for one or more occurrences having similar characteristics, the anomaly model 782 may be trained to require information relating to the particular characteristics of the underlying data in order to output a conclusion with regard to detecting the absence of anomalies.

In some embodiments, when a single metadata item is dispositive of an occurrence of an anomaly, the anomaly model 782 may be trained to scan the data items correspond to the categories of the metadata item with a priority in order to detect anomalies with a higher efficiency and accuracy.

In implementations, where there is an order in analyzing metadata that may lead to a conclusion of an occurrence of an anomaly, cascade-based models may be utilized to orchestrate the anomaly model 782 into one or more cascade-based models. For example, a cascade-model based anomaly model 782 may be configured with a plurality of stages including a first stage associated with a first model and a first detection threshold, and a second stage associated with a second model and a second detection threshold. An exemplary first stage may include a first model trained to detect anomalies based on a set of prioritized metadata items and the features. Here, the cascade-model progresses into the second stage to apply the second model to a second subset of the metadata only when an anomaly is detected in the first stage by applying the first model to a first subset of the metadata. In some embodiments, the number of stages, the model and detection threshold associated with the stages may be configured based on the characteristics of the associated batch automation processes. In some embodiments, the configuration of the number of stages, the model and detection threshold associated with the stages may be trained and/or retrained using various training datasets.

In some embodiments, categories of metadata in the training dataset may be designated with respective weights to indicate the relative importance of the occurrence of the activities underlying the metadata. As such, the anomaly model 782 may be trained to determine a risk level associated with a detection of an anomaly based on the weighting factors associated with the underlying metadata items. In some embodiments, a weight value respective to a category of metadata may be designated as zero based on underlying batch automation information to indicate that such metadata is not to be extracted or otherwise identified. In some embodiments, the weights associated with metadata items may also be adjusted based on machine learned knowledge with regard to, for example, at what context a specific weight accurately manifest the risk level associated with a metadata item.

In some embodiments, the anomaly model 782 may be retrained based on the confirmation of a detection of an anomaly and/or a false positive detection of an anomaly. In some embodiments, the detected anomaly is further verified manually or otherwise confirmed prior to or during the triggering and processing of actions responsive to the anomaly detections. In one implementation, a security token may be generated as an indicator to signal that the detected anomaly is not false positive and the appropriate actions are triggered to address and/or remedy the detected issues or concerns, e.g., with a job. In some embodiments, the anomaly model 782 may be retrained based on updates and/or changes to the training dataset. For example, depending on a user or a group of users' newly developed characteristics, correspondingly updated training dataset may be obtained and utilized to retrain the anomaly model to adjust its knowledge and intelligence with regard to anomaly detection.

Figure 8:
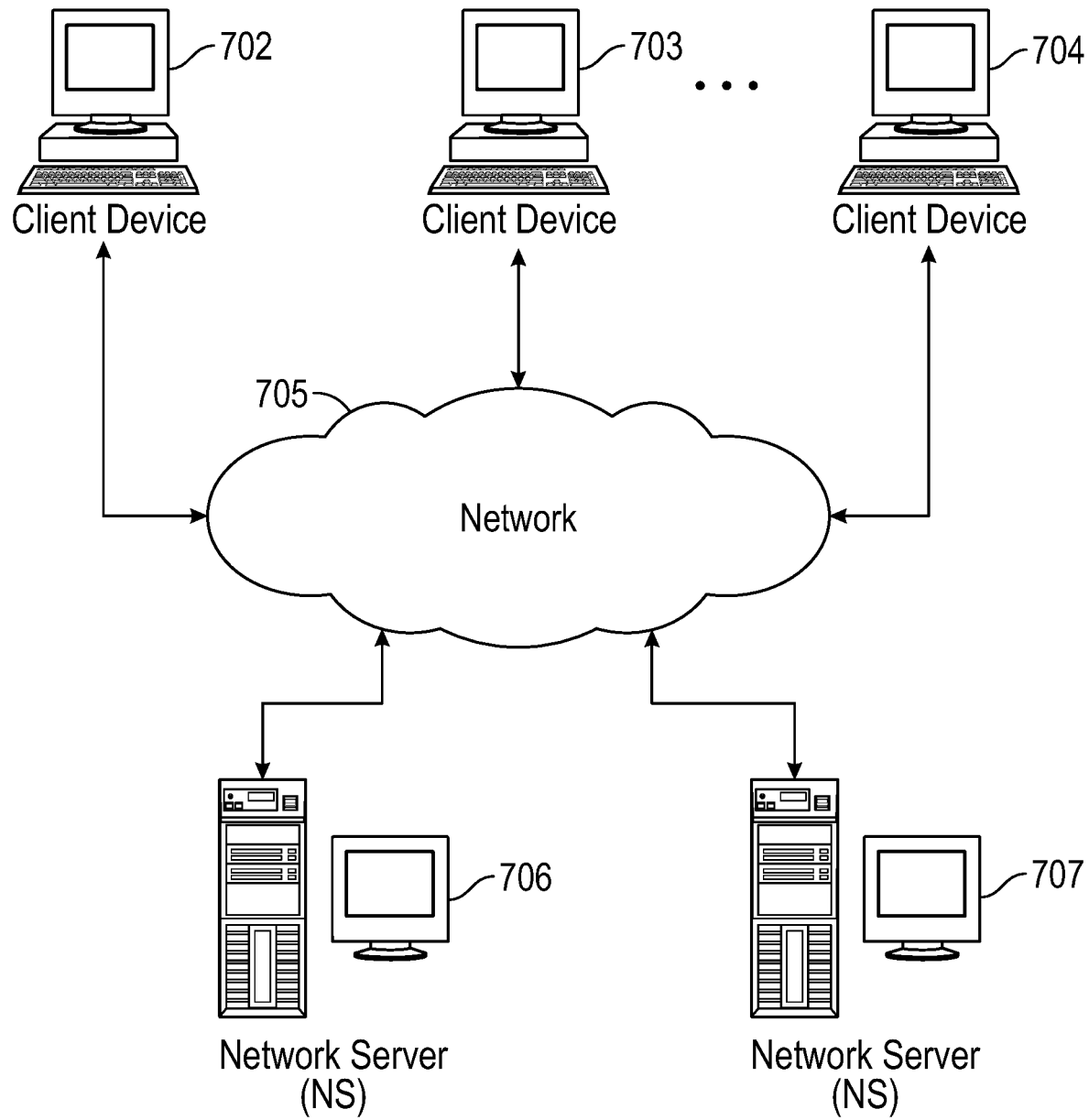
FIG. 8 is a block diagram depicting an exemplary computer-based system and/or platform, consistent with exemplary aspects of certain embodiments of the present disclosure.

FIG. 8 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 8, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 8, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 9:
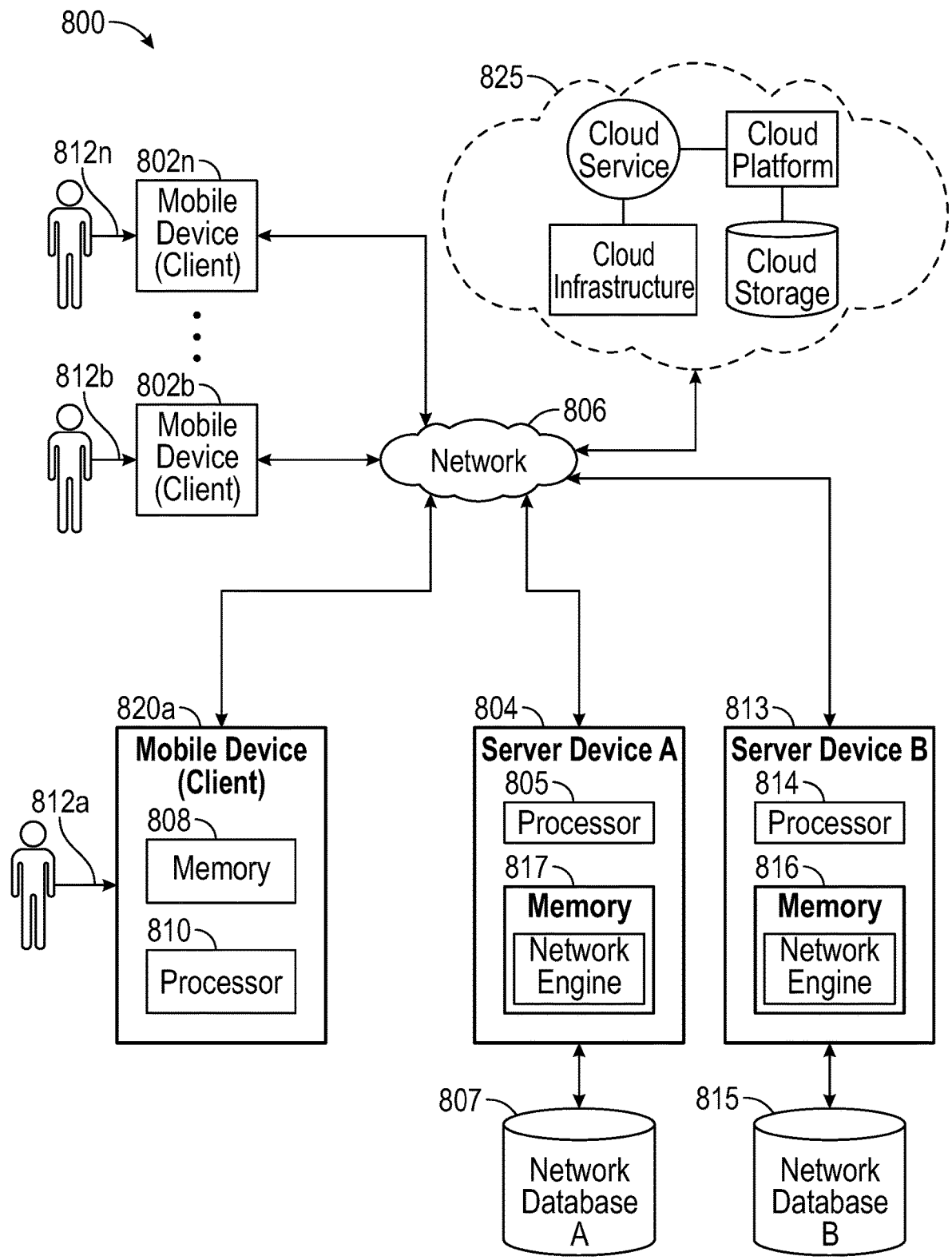
FIG. 9 is a block diagram depicting another exemplary computer-based system and/or platform, consistent with exemplary aspects of certain embodiments of the present disclosure.

FIG. 9 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b through 802n shown each at least includes computer-readable media, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 9, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
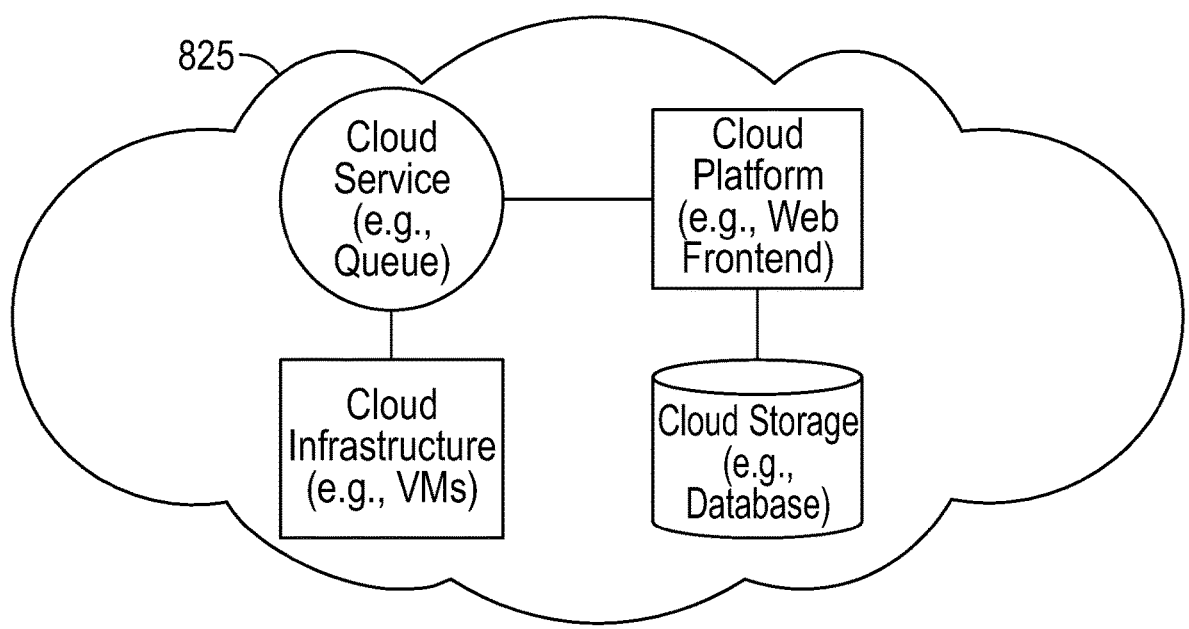
FIGS. 10 and 11 are diagrams illustrating two exemplary implementations of cloud computing architecture/aspects with respect to which the disclosed technology may be specifically configured to operate, consistent with exemplary aspects of various embodiments of the present disclosure.
Figure 11:
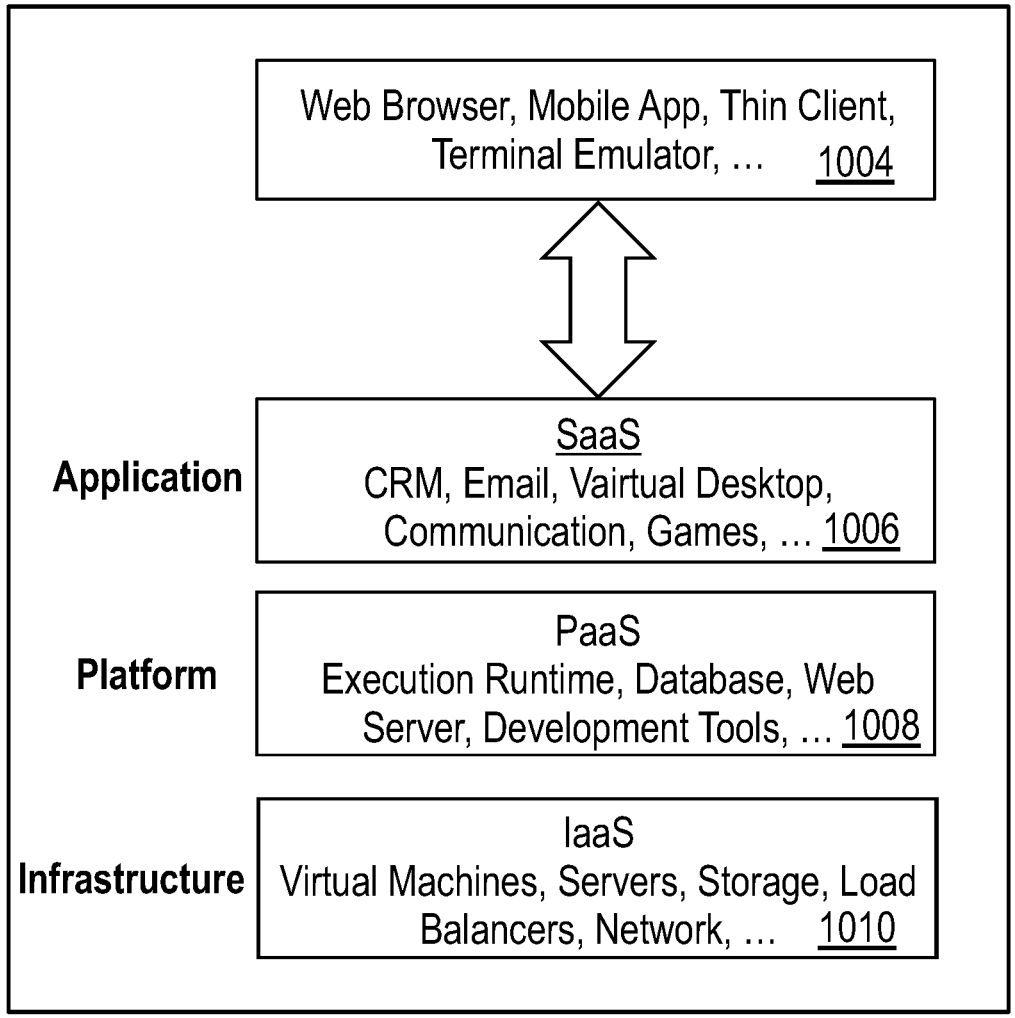

As also shown in FIGS. 10 and 11, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 11, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 10 and 11 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and/or other communication or software applications, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 10-11) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™; (33) Windows Runtime (WinRT™); (34) IBM i™; (35) IBM AIX™; (36) Microsoft DirectX™; (37) Eclipse Rich Client Platform.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
  obtaining, by at least one computing device, a plurality of historical data from prior execution of one or more batch processes, the historical data comprising batch object data, incident data, and change order data;
  training, by the at least one computing device, a machine learning model to predict one or both of at least one future failure or at least one future flag (late/timing issues [e.g. start times, etc.], mismatches, failure trend, success trend, anomaly trend, etc.) in execution of a future batch process, the training comprising:
    extracting, by the at least one computing device, sets of features from the historical data, each feature of the sets of features relating to a failure in a historical execution, each set comprising a plurality of: a set of execution features, a set of object features, a set of workflow features, or a set of incident features;
    pre-processing, by the at least one computing device, the sets of features to generate a training dataset; and
    training, by the at least one computing device, the machine learning model with the training dataset;
  collecting and/or generating, by the at least one computing device, descriptive analytics regarding one or more of: a mapping dependency, a history of information of files, or real-time information of the files;
  predicting, by the at least one computing device, a future failure and/or future flag in execution of the batch processes using the trained machine learning model and the descriptive analytics; and/or generating, by the at least one computing device, at least one alert identifying at least one of: the future failure or the future flag.

Clause 2. The method of clause 1 or of any clause herein, wherein the training of the machine learning model comprises evaluating a prediction result of the machine learning model and retraining the machine learning model.

Clause 3. The method of clause 1 or any clause herein, further comprising jobs that are at risk of failure.

Clause 4. The method of clause 3 or any clause herein, wherein the alert includes a prediction with regard to a starting time when the incident is predicted to incur for a process of the batch of processes.

Clause 5. The method of clause 1 or any clause herein, further comprising:
  removing features related a manual restart of a process from the sets of features;
  selecting first sets of features related to processes that have run successfully and second sets of features related to processes that have incurred failure; and
  splitting the sets of features into a first training dataset and a second training dataset, the first training dataset related to the first sets of features and the second training dataset related to the second sets of features, the first and second training dataset included in the training dataset.

Clause 6. The method of clause 1 or any clause herein, wherein the predicting the future failure comprises predicting a failing status with regard to at least one of: a job run time, a job status, a job rank in a workflow, a proximity to a configuration change in terms of a time duration, a proximity to a configuration change in terms of dependencies, a status associated with a file being generated on time, a status associated with a file being available, a status associated with a file being complete, a status associated with a file being accurate; a workflow dependency, a support/ownership identity; a dynamic threshold with regard to data, a holiday schedule, and a banking processing schedule.

Clause 7. The method of clause 1 or any clause herein, further comprising determining and issuing one or more proactive actions based on a predicted future failure.

Clause 8. The method of clause 1 or any clause herein, wherein the mapping dependencies comprise one or more inter-workflow dependencies and/or one or more intra-workflow dependencies.

Clause 9. The method of clause 1 or any clause herein, further comprising: monitoring data/anomalies of batch processes.

Clause 10. A system comprising:
  one or more processors; and
  at least one memory and/or computer-readable media in communication with the one or more processors and storing instructions that, when executed by the one or more processors, cause the one or more processors to:
    obtain a plurality of historical data from prior execution of one or more batch processes, the historical data comprising batch object data, incident data, and change order data;
    train a machine learning model to predict one or both of at least one future failure or at least one future flag (late/timing issues [e.g. start times, etc.], mismatches, failure trend, success trend, anomaly trend, etc.) in execution of a future batch process, comprising:
      extract sets of features from the historical data, each feature of the sets of features relating to a failure in a historical execution, each set comprising a plurality of: a set of execution features, a set of object features, a set of workflow features, or a set of incident features;
      pre-process the sets of features to generate a training dataset; and
      train the machine learning model with the training dataset;
    collect/generate descriptive analytics regarding one or more of: a mapping dependency, a history of information of files, or real-time information of the files; and
    predict a future failure and/or future flag in execution of the batch processes using the trained machine learning model and the descriptive analytics.

Clause 11. The system of clause 10 of any clause herein, wherein to train the machine learning model comprises to evaluate a prediction result of the machine learning model and retraining the machine learning model.

Clause 12. The system of clause 10 of any clause herein, the one or more processors are further configured to trigger an alert based on: (i) detection of late files, and (ii) identification of one or more jobs that are at risk of failure.

Clause 13. The system of clause 12 of any clause herein, wherein the alert includes a prediction with regard to a starting time when the incident is predicted to incur for a process of the batch of processes.

Clause 14. The system of clause 10 of any clause herein, wherein the one or more processors are further configured to:
  remove features related a manual restart of a process from the sets of features;
  select first sets of features related to processes that have run successfully and second sets of features related to processes that have incurred failure; and
  split the sets of features into a first training dataset and a second training dataset, the first training dataset related to the first sets of features and the second training dataset related to the second sets of features, the first and second training dataset included in the training dataset.

Clause 15. The system of clause 10 of any clause herein, wherein the predicting the future failure comprises predicting a failing status with regard to at least one of: a job run time, a job status, a job rank in a workflow, a proximity to a configuration change in terms of a time duration, a proximity to a configuration change in terms of dependencies, a status associated with a file being generated on time, a status associated with a file being available, a status associated with a file being complete, a status associated with a file being accurate; a workflow dependency, a support/ownership identity; a dynamic threshold with regard to data, a holiday schedule, and a banking processing schedule.

Clause 16. The system of clause 10 of any clause herein, wherein the one or more processors are further configured to determine and/or issue one or more proactive actions based on a predicted future failure.

Clause 17. The system of clause 10 of any clause herein, wherein the mapping dependencies comprise one or more inter-workflow dependencies and/or one or more intra-workflow dependencies.

Clause 18. The system of clause 10 or any clause herein, wherein the instructions further cause the one or more processors to: monitoring data/anomalies of batch processes.

Clause 19. A non-transitory computer readable medium for tangibly storing computer program instructions capable of being executed by at least one computer processor, the computer program instructions executable by the at least one computer processor for:
  obtaining, by at least one computing device, a plurality of historical data from prior execution of one or more batch processes, the historical data comprising batch object data, incident data, and change order data;
  training, by the at least one computing device, a machine learning model to predict one or both of at least one future failure or at least one future flag (late/timing issues [e.g. start times, etc.], mismatches, failure trend, success trend, anomaly trend, etc.) in execution of a future batch process, the training comprising:
  extracting, by the at least one computing device, sets of features from the historical data, each feature of the sets of features relating to a failure in a historical execution of at least one batch process of the one or more batch processes, each set comprising a plurality of: a set of execution features, a set of object features, a set of workflow features, or a set of incident features;
  pre-processing, by the at least one computing device, the sets of features to generate a training dataset; and
  training, by the at least one computing device, the machine learning model with the training dataset;
  generating and/or collecting, by the at least one computing device, descriptive analytics regarding one or more of: a mapping dependency, a history of information of files, or real-time information of the files; and
  predicting, by the at least one computing device, a future failure and/or future flag in execution of the batch processes using the trained machine learning model and the descriptive analytics.

Clause 20. The computer readable medium of claim 19 or any clause herein, wherein the training of the machine learning model comprises evaluating a prediction result of the machine learning model and retraining the machine learning model.

Clause 21. The computer readable medium of claim 19 or any clause herein, wherein the instructions further comprise: triggering an alert based on: (i) detection of late files, and (ii) identification of one or more jobs that are at risk of failure.

Clause 22. The computer readable medium of claim 21 or any clause herein, wherein the alert includes a prediction with regard to a starting time when the incident is predicted to incur for a process of the batch of processes.

Clause 23. The computer readable medium of claim 19 or any clause herein, wherein the instructions further comprise: monitoring data/anomalies of batch processes.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

APPENDIX A

FEATURE EXPLANATIONS

| Feature Name in Scripts | Output Domain/ Range (if Avail) | Meaning | Assumption/justification |
| --- | --- | --- | --- |
| ML_DAYS_SINCE_ LAST_MODIF | int >= 0 | How many days since the last configuration change | Jobs that were changed recently may fail more often due to uncertainty<br>Jobs that have not been changed recently may fail more often because it's out of date |
| ML_IN_WORKFLOW | Int 0-False, 1-True | Is the job in a workflow | Jobs that are in a workflow tend to be more complicated and have more dependencies than single task jobs |
| MAL_PREV_RUN | Int 0-False, 1-True | Is the job dependent on a previous run of itself | Jobs that are dependent upon previous runs tend to fail more, if the previous rus failed, the currest job will likely fail |

APPENDIX A-continued

FEATURE EXPLANATIONS

| Feature Name in Scripts | Output Domain/ Range (if Avail) | Meaning | Assumption/justification |
|---|---|---|---|
| ML_FILE_WATCHERS | Int >= 0 | How many file watchers does this job directly depend on | File watchers fail frequently, either from a file missing or file being late. If a job depends on many file watchers, it is more likely to fail |
| AH_RUNTIME | Double >= 0.0 | The run time of the last run of the job | A high runtime correlates to a high failure probability either from the job waiting on something, hanging, or being extremely complicated |
| AH_ERT | Double >= 0.0 | The estimated run time of the job | A high runtime correlates to a high failure probability either from the job waiting on something, hanging, or being extremely complicated |
| AH_MODCNT | Int >= 0 | How many times was the job modified | If the job was modified many times, it is likely to fail |
| ML_JOB_OCC | Int >= 0 | How many times does the job run in the dataset | A job that runs infrequently may fail more often as its not a common workflow  A job that runs extremely frequently tend has a high failure rate) is probably a job that no one cares about |
| ML_FAILURE_PC | Double >= 0.0; <= 100.0 | The failure percentage of past runs | A job that fails extremely frequently is very likely to fail again. Some jobs aren't fixed and are known to fail every day. |
| ML_DIFFERENCE_IN_FAILURE_PCT | Double >= −100.0) <= 100.0 | The difference in the failure percentage between the current configuration and the last configuration | If a job was fixed in the new configuration, the difference in failure percentage will go down, indicating that the job is likely to keep passing. Vice versa is also true. |
| ML_ST_YEAR | Int >= 2019 | The year that the job is going to run | |
| ML_ST_MONTH | Int >= 1; <= 12 | The month that the job is going to run | The month that the job runs may indicate if the job is more likely to fail due to cyclical patterns. Only viable if we have a full year dataset |
| ML_ST_DAY | Int >= 1; <= 31 | The day that the job is going to run | The day that the job runs may indicate if the job is more likely to fail due to cyclical patterns |
| MAL_ST_WEEKDAY | Int >= 0; <= 6 (Monday is 0) | The day of the week the job is going to run | The weekday that the job runs may indicate if the job is more likely to fail due to cyclical patterns. Jobs on weekend may be more likely to fail. |
| ML_ST_HOUR | Int >= 0; <= 23 | The hour that the job is going to run | The hour that the job runs may indicate if the job is more likely to fail due to cyclical patterns. Jobs on off-hours may be more likely to fail. |
| ML_ST_MINUTE | Int >= 0; <= 59 | The minute that the job is going to run | The minute that the job runs may indicate if the job is more likely to fail due to cyclical patterns |
| ML_ST_HOLIDAY | Int 0-False, 1-True | is the job on a holiday | jobs that are on a holiday may be more likely to fail |
| ML_INC_1_2_3_CUM | Int >= 0 | The amount of sev 1-3s that are linked to the job | Jobs that have had high severity incidents may be indicators of future failures |
| ML_INC_4_5_CUM | Int >= 0 | The amount of sev 4-5s that are linked to the job | Jobs that have had incidents may be indicators of future failures |
| ML_MEAN_PRD | Double >= 0.0 | The predecessor job's average failure rate | Jobs that have predecessors that fail frequently are also likely to fail |
| ML_MIN_PRD | Double >= 0.0 | The predecessor job's minimum failure rate | Jobs that have predecessors that fail frequently are also likely to fail |
| ML_MAX_PRD | Double >= 0.0 | The predecessor job's maximum failure rate | Jobs that have predecessors that fail frequently are also likely to fail |
| ML_MEAN_SCR | Double >= 0.0 | The successor job's average failure rate | Jobs that have successors that fail frequently are also likely to fail |
| ML_MIN_SCR | Double >= 0.0 | The successor job's minimum failure rate | Jobs that have successors that fail frequently are also ikely to fail |
| ML_MAX_SCR | Double >= 0.0 | The successor job's maximum failure rate | Jobs that have successors that fail frequently are also likely to fail |
| ML_WKF_HOST_NB | Int >= 0 | The amount of hosts for a workflow | Jobs that have a higher number of hosts for the workflow are more likely to fail |
| ML_NUM_JOBS_IN_WORKFLOW | Int >= 0 | The total amount of jobs in the workflow | Jobs that have a more complex workflow are more likely to fail |
| ML_EVNT_COUNT | Int >= 0 | The amount of EVNT jobs in a workflow | EVNT jobs, like file watcher, are more likely to fail than JOBP or JOBS and a higher amount of them in a workflow increase the likelihood of failure |
| ML_JOBP_COUNT | Int >= 0 | The amount of JOBP jobs in a workflow | |
| ML_JOBS_COUNT | Int >= 0 | The amount of EES jobs in a workflow | |
| ML_SCRI_COUNT | Int >= 0 | The amount of SCRI jobs in a workflow | SCRI (script) jobs are more likely to fail than JOBP or JOBS jobs and a higher amount of them in a workflow increase the likelihood of failure |

The invention claimed is:

1. A computer-implemented method comprising:
obtaining, by at least one computing device, historical data from prior executions of one or more batch processes, the historical data comprising batch object data, incident data, and change order data;
training, by the at least one computing device, a machine learning model to predict one or both of at least one future failure or at least one future flag in execution of a future batch process, the training comprising:
extracting, by the at least one computing device, sets of features from the historical data, each feature of the sets of features relating to a failure in a historical execution of at least one batch process of the one or more batch processes, each set comprising a plurality of: a set of execution features, a set of object features, a set of workflow features, or a set of incident features;
pre-processing, by the at least one computing device, the sets of features to generate a training dataset; and
training, by the at least one computing device, the machine learning model with the training dataset;
generating, by the at least one computing device, based on current data of at least one future batch process, descriptive analytics regarding one or more of: a mapping dependency, a history of information of files, or real-time information of the files; and
utilizing, by the at least one computing device, the trained machine learning model and the descriptive analytics to predict one or more future failures and/or future flags in execution of the at least one future batch process; and
generating, by at least one computing device, at least one alert identifying the one or more future failures and/or future flags.

2. The method of claim 1, wherein the training of the machine learning model to predict one or both of at least one future failure or at least one future flag, further comprises evaluating a prediction result of the machine learning model and
retraining the
machine learning model.

3. The method of claim 1, further comprising:
triggering one or more alerts based on one or both of: (i) detection of late files, and (ii) identification of one or more jobs that are at risk of failure.

4. The method of claim 3, wherein at least one of the one or more alerts include a prediction with regard to a starting time when an incident is predicted to incur for a process of the one or more batch processes.

5. The method of claim 1, further comprising:
removing features related a manual restart of a process from the sets of features; selecting first sets of features related to processes that have run successfully and second sets of features related to processes that have incurred failure; and
splitting the sets of features into a first training dataset and a second training dataset, the first training dataset related to the first sets of features and the second training dataset related to the second sets of features, the first and second training dataset included in the training dataset.

6. The method of claim 1, wherein predicting a failure of the at least one future failure comprises predicting a failing status with regard to at least one of: a job run time, a job status, a job rank in a workflow, a proximity to a configuration change in terms of a time duration, a proximity to a configuration change in terms of dependencies, a status associated with a file being generated on time, a status associated with a file being available, a status associated with a file being complete, a status associated with a file being accurate, a workflow dependency, a support/ownership identity, a dynamic threshold with regard to data, a holiday schedule, and a banking processing schedule.

7. The method of claim 1, further comprising determining and issuing one or more proactive actions based on a predicted future failure.

8. The method of claim 1, wherein the mapping dependency comprises at least one inter-workflow dependency and/or at least one intra-workflow dependency.

9. A system comprising: one or more processors; and
at least one computer-readable media and/or memory in communication with the one or more processors and storing instructions that, when executed by the one or more processors, cause the one or more processors to:
obtain historical data from prior execution of one or more batch processes, the historical data comprising batch object data, incident data, and change order data;
train a machine learning model to predict one or both of at least one future failure or at least one future flag in execution of a future batch process, comprising:
extracting sets of features from the historical data, each feature of the sets of features relating to a failure in a historical execution of at least one batch process of the one or more batch processes, each set comprising a plurality of: a set of execution features, a set of object features, a set of workflow features, or a set of incident features;
pre-processing the sets of features to generate a training dataset; and training the machine learning model with the training dataset;
generate descriptive analytics regarding one or more of: a mapping dependency, a history of information of files, or real-time information of the files; and
predict a future failure and/or future flag in execution of the one or more batch processes using the trained machine learning model and the descriptive analytics.

10. The system of claim 9, wherein the training of the machine learning model to predict one or both of at least one future failure or at least one future flag further comprises evaluating a prediction result of the machine learning model and retraining the machine learning model.

11. The system of claim 9, wherein the one or more processors are further configured to trigger an alert based on: (i) detection of late files, and (ii) identification of one or more jobs that are at risk of failure.

12. The system of claim 11, wherein the alert includes a prediction with regard to a starting time when an incident is predicted to incur for a process of the one or more batch processes.

13. The system of claim 9, wherein the one or more processors are further configured to:
remove features related a manual restart of a process from the sets of features; select first sets of features related to processes that have run successfully and
second sets of features related to processes that have incurred failure; and
split the sets of features into a first training dataset and a second training dataset, the first training dataset related to the first sets of features and the second training dataset related to the second sets of features, the first and second training dataset included in the training dataset.

14. The system of claim 9, wherein predicting a failure of the at least one future failure comprises predicting a failing status with regard to at least one of: a job run time, a job status, a job rank in a workflow, a proximity to a configuration change in terms of a time duration, a proximity to a configuration change in terms of dependencies, a status associated with a file being generated on time, a status associated with a file being available, a status associated with a file being complete, a status associated with a file being accurate, a workflow dependency, a support/ownership identity, a dynamic threshold with regard to data, a holiday schedule, and a banking processing schedule.

15. The system of claim 9, wherein the one or more processors are further configured to determine and issue one or more proactive actions based on a predicted future failure.

16. The system of claim 9, wherein the mapping dependency comprises at least one inter-workflow dependency and/or at least one intra-workflow dependency.

17. A non-transitory computer readable storage medium for tangibly storing computer program instructions capable of being executed by a computer processor, the computer program instructions comprising instructions for:
obtaining, by at least one computing device, historical data from prior execution of one or more batch processes, the historical data comprising batch object data, incident data, and change order data;
training, by the at least one computing device, a machine learning model to predict one or both of future failures or future flags in execution of a future batch process, the training comprising:
extracting, by the at least one computing device, sets of features from the historical data, each feature of the sets of features relating to a failure in a historical execution of at least one batch process of the one or more batch processes, each set comprising a plurality of: a set of execution features, a set of object features, a set of workflow features, or a set of incident features;
pre-processing, by the at least one computing device, the sets of features to generate a training dataset; and
training, by the at least one computing device, the machine learning model with the training dataset;
generating, by the at least one computing device, descriptive analytics regarding one or more of: a mapping dependency, a history of information of files, or real-time information of the files; and
predicting, by the at least one computing device, a future failure and/or future flag in execution of the one or more batch processes using the trained machine learning model and the descriptive analytics.

18. The computer readable storage medium of claim 17, wherein the training of the machine learning model to predict one or both of future failures or future flags further comprises evaluating a prediction result of the machine learning model and retraining the machine learning model.

19. The computer readable storage medium of claim 17, wherein the instructions further comprise: triggering an alert based on: (i) detection of late files, and (ii) identification of one or more jobs that are at risk of failure.

20. The computer readable storage medium of claim 19, wherein the alert includes a prediction with regard to a starting time when an incident is predicted to incur for a process of the one or more batch processes.

* * * * *